US012655541B2

(12) United States Patent
Li et al.

(10) Patent No.: US 12,655,541 B2
(45) Date of Patent: Jun. 16, 2026

(54) SHARK SKIN BIOMIMETIC FABRICS FOR FUNCTIONAL CLOTHING

(71) Applicant: Colorado State University Research Foundation, Fort Collins, CO (US)

(72) Inventors: Yan Vivian Li, Fort Collins, CO (US); Jiayi Wen, Fort Collins, CO (US); Saloni Purandare, Ames, IA (US)

(73) Assignee: Colorado State University Research Foundation, Fort Collins, CO (US)

( * ) Notice: Subject to any disclaimer, the term of this patent is extended or adjusted under 35 U.S.C. 154(b) by 374 days.

(21) Appl. No.: 18/140,953

(22) Filed: Apr. 28, 2023

(65) Prior Publication Data

US 2023/0349075 A1 Nov. 2, 2023

Related U.S. Application Data

(60) Provisional application No. 63/336,894, filed on Apr. 29, 2022.

(51) Int. Cl.
| | |
|---|---|
| D01F 6/64 | (2006.01) |
| B32B 3/08 | (2006.01) |
| (Continued) | |

(52) U.S. Cl.
CPC ................ D01F 6/64 (2013.01); B32B 3/085 (2013.01); B32B 5/02 (2013.01); B32B 27/12 (2013.01);
(Continued)

(58) Field of Classification Search
USPC ... 442/59, 60, 193, 195, 196, 308, 335, 336, 442/337
See application file for complete search history.

(56) References Cited

U.S. PATENT DOCUMENTS

| | | | | |
|---|---|---|---|---|
| 7,650,848 | B2 * | 1/2010 | Brennan et al. ........ | B63B 59/04 |
| | | | | 114/222 |
| 10,716,340 | B2 * | 7/2020 | Aihara ................. | A41D 31/185 |
| 11,154,100 | B2 * | 10/2021 | Molyneux ............ | A41D 13/012 |

FOREIGN PATENT DOCUMENTS

| | | | | | |
|---|---|---|---|---|---|
| CA | 2447217 C | * | 10/2010 | .............. | B63B 1/34 |
| WO | WO-2018152459 A1 | * | 8/2018 | ........... | A41D 31/102 |
| WO | WO-2019189412 A1 | * | 10/2019 | ............. | A01N 25/10 |

OTHER PUBLICATIONS

Oeffner J, Lauder G. The hydrodynamic function of shark skin and two biomimetic applications. Journal of Experimental Biology. 2012;215(5):785-795.

(Continued)

*Primary Examiner* — Ula C Ruddock
(74) *Attorney, Agent, or Firm* — Patterson + Sheridan, LLP

(57) ABSTRACT

Embodiments of the present disclosure relate to a denticle array. The denticle array includes a substrate and a plurality of denticles coupled to the substrate. Each denticle of the plurality of denticles includes an upper portion and a lower portion. The upper portion includes an upper body. The lower portion includes a lower body. The upper body includes a first prong extending from a front end of the denticle to a rear end of the denticle, a second prong extending from the front end of the denticle to a rear end of the denticle, and a third prong extending from the front end of the denticle to a rear end of the denticle. A first ridge separates the first prong and second prong. A second ridge separates the first prong from the third prong. The first prong has a length greater than the second prong and the third prong.

34 Claims, 23 Drawing Sheets

(51) Int. Cl.

| | |
|---|---|
| *B32B 5/02* | (2006.01) |
| *B32B 27/12* | (2006.01) |
| *B33Y 80/00* | (2015.01) |
| *D01F 6/18* | (2006.01) |
| *D01F 6/70* | (2006.01) |
| *D01F 11/12* | (2006.01) |

(52) U.S. Cl.
CPC ............... *B33Y 80/00* (2014.12); *D01F 6/18* (2013.01); *D01F 6/70* (2013.01); *D01F 11/127* (2013.01); *B32B 2307/7145* (2013.01); *B32B 2307/746* (2013.01); *D10B 2403/033* (2013.01)

(56) References Cited

OTHER PUBLICATIONS

Purandare S. Mechanical and antimicrobial performance analysis of a shark skin bio-mimicked fabric swatch via 3D printing. 2020, 64 pages.

Rettner R. Shark Skin-Like Surfaces May Ward Off Hospital Superbugs [Internet]. LiveScience. 2022 [cited Jan. 13, 2022]; <https://www.livescience.com/47870-shark-skin-hospital-superbugs.html>.

Domel A, Domel G, Weaver J, Saadat M, Bertoldi K, Lauder G. Hydrodynamic properties of biomimetic shark skin: effect of denticle size and swimming speed. Bioinspiration & Biomimetics. 2018;13(5):056014, 16 pages.

Wen L, Weaver J, Thornycroft P, Lauder G. Hydrodynamic function of biomimetic shark skin: effect of denticle pattern and spacing. Bioinspiration & Biomimetics. 2015;10(6):066010.

Fu Y, Yuan C, Bai X. Marine drag reduction of shark skin inspired riblet surfaces. Biosurface and Biotribology. 2017;3(1):11-24.

Wen L, Weaver J, Lauder G. Biomimetic shark skin: design, fabrication and hydrodynamic function. Journal of Experimental Biology. 2014;217(10):1656-1666.

Pu X, Li G, Huang H. Preparation, anti-biofouling and drag-reduction properties of a biomimetic shark skin surface. Biology Open. 2016;5(4):389-396.

Kanagusuku K, Dufflocq P, Sánchez-Rea A, Huamantinco A, Ramírez-Amaro S. Morphological characterization of dermal denticles of the Broadnose Sevengill Shark *Notorynchus cepedianus* (Elasmobranchii: Hexanchidae). Universitas Scientiarum. 2021;26(3).

Mann E, Manna D, Mettetal M, May R, Dannemiller E, Chung K et al. Surface micropattern limits bacterial contamination. Antimicrobial Resistance and Infection Control. 2014;3(1).

* cited by examiner

1200

1200

1200

1200

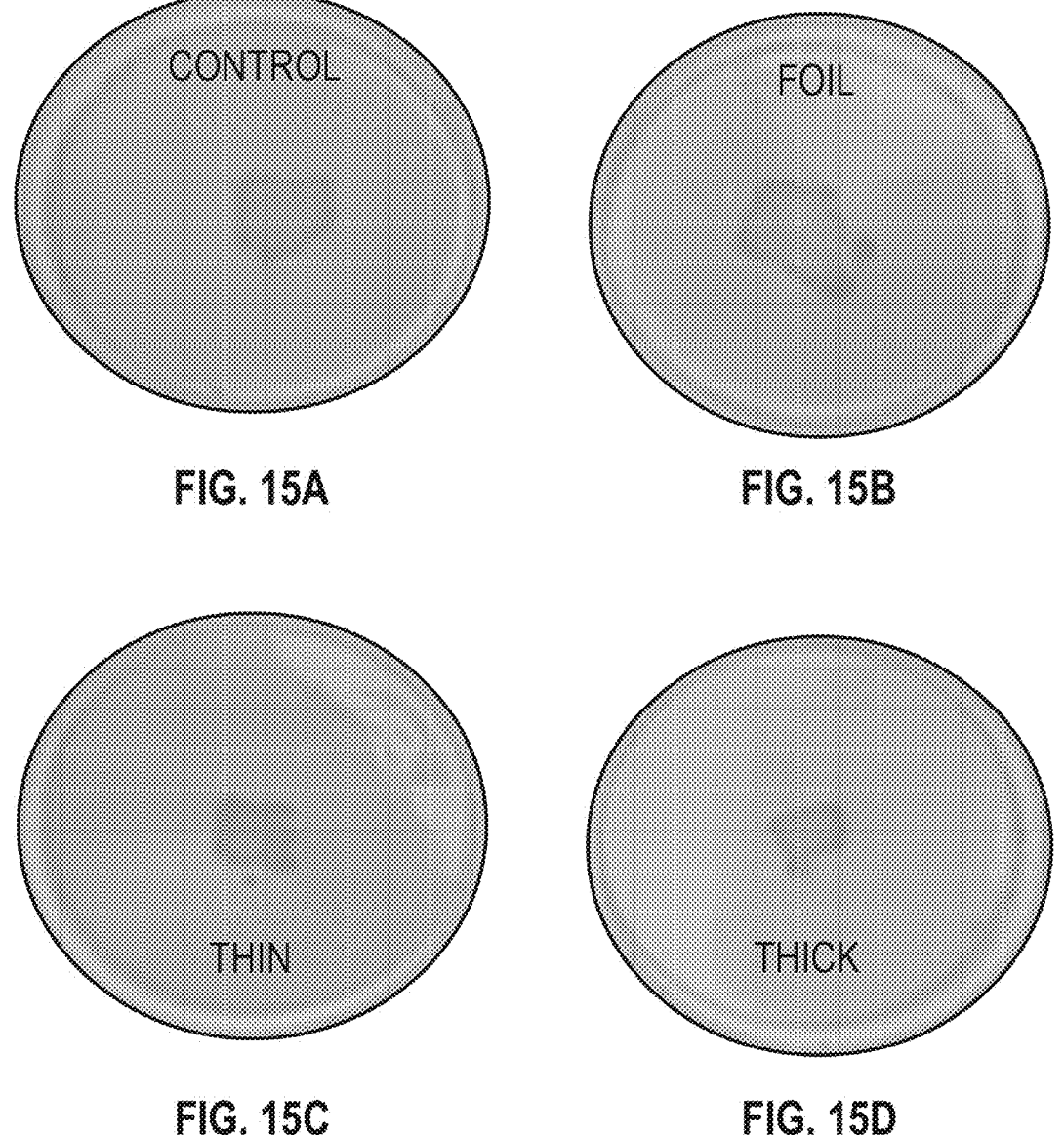
FIG. 15A                                    FIG. 15B
FIG. 15C                                    FIG. 15D

SHARK SKIN BIOMIMETIC FABRICS FOR FUNCTIONAL CLOTHING

CROSS-REFERENCE TO RELATED APPLICATIONS

This application claims priority to U.S. Provisional Patent Application Ser. No. 63/336,894, filed on Apr. 29, 2022, which is herein incorporated by reference in its entirety.

BACKGROUND

Field

Embodiments of the present disclosure generally relate to material surface modification. In particular, embodiments of the disclosure relate to textiles having functional features.

Description of the Related Art

Functional clothing is a type of textile designed for a specific function, which is typically considered to be beyond the basic application of body covering or aesthetics. Within functional clothing, bio-mimicked textiles have been developed by imitating elements of nature or using nature as a source of inspiration in textile design. Some examples of bio-mimicked textiles include water-repellent lotus leaf-inspired fabric, firefly-inspired textiles capable of glowing in the dark, and super-tough yet super-light spider silk. Recently, shark skin bio-mimicry has been of great interest for developing functional clothing, especially for sportswear.

The first use of biomimicry of shark skin in practical applications was seen in ships and racing boats covered in vinyl-film saw-tooth riblets to reduce transport costs. In textiles, the riblet effect for swimsuit applications has been attempted, however, such attempts at bio-mimicking shark skin had drawbacks due to inaccurate replication of the complex riblet effect. Ultimately, this resulted in no improvement in swimming performance, limiting the material's practical potential in functional clothing.

Accordingly, what is needed in the art are accurate and easily producible shark-skin bio-mimicking textiles.

SUMMARY

In one embodiment, a denticle is disclosed. The denticle includes an upper portion and a lower portion. The upper portion includes an upper body. The lower portion includes a lower body. The upper body includes a first prong extending from a front end of the denticle to a rear end of the denticle, a second prong extending from the front end of the denticle to a rear end of the denticle, and a third prong extending from the front end of the denticle to a rear end of the denticle. A first ridge separates the first prong and second prong. A second ridge separates the first prong from the third prong. The first prong has a length greater than the second prong and the third prong.

In another embodiment, a denticle array is disclosed. The denticle array includes a substrate and a plurality of denticles coupled to the substrate. Each denticle of the plurality of denticles includes an upper portion and a lower portion. The upper portion includes an upper body. The lower portion includes a lower body. The upper body includes a first prong extending from a front end of the denticle to a rear end of the denticle, a second prong extending from the front end of the denticle to a rear end of the denticle, and a third prong extending from the front end of the denticle to a rear end of the denticle. A first ridge separates the first prong and second prong. A second ridge separates the first prong from the third prong. The first prong has a length greater than the second prong and the third prong.

In yet another embodiment, a textile is disclosed. The textile includes a substrate and a plurality of denticles coupled to the substrate. Each denticle of the plurality of denticles includes an upper portion and a lower portion. The upper portion includes an upper body. The lower portion includes a lower body. The upper body includes a first prong extending from a front end of the denticle to a rear end of the denticle, a second prong extending from the front end of the denticle to a rear end of the denticle, and a third prong extending from the front end of the denticle to a rear end of the denticle. A first ridge separates the first prong and second prong. A second ridge separates the first prong from the third prong. The first prong has a length greater than the second prong and the third prong.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 15A is a photograph illustrating *E. coli* growth on the control sample, according to one or more embodiments described herein.

FIG. 15B is a photograph illustrating *E. coli* growth on the copper foil sample, according to one or more embodiments described herein.

FIG. 15C is a photograph illustrating *E. coli* growth on the thick polyurethane (PU) array, according to one or more embodiments described herein.

FIG. 15D is a photograph illustrating *E. coli* growth on the thin polyurethane (PU) array, according to one or more embodiments described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments of the present disclosure generally relate to material surface modification. In particular, embodiments of the disclosure relate to textiles having functional features.

The inventors have discovered designs and processes for forming shark skin bio-mimicked denticles on a substrate or textile, which can be used in various functional clothing applications or other applications, using 3D printing technology. In contrast to conventional technologies, the embodiments of the present disclosure exhibit increased anti-microbial and strength properties and decreased drag properties that enable the denticle design to function more effectively as an article of functional clothing.

The use of headings is for purposes of convenience and does not limit the scope of the present disclosure. Embodiments described herein can be combined with other embodiments.

Figure 1A:
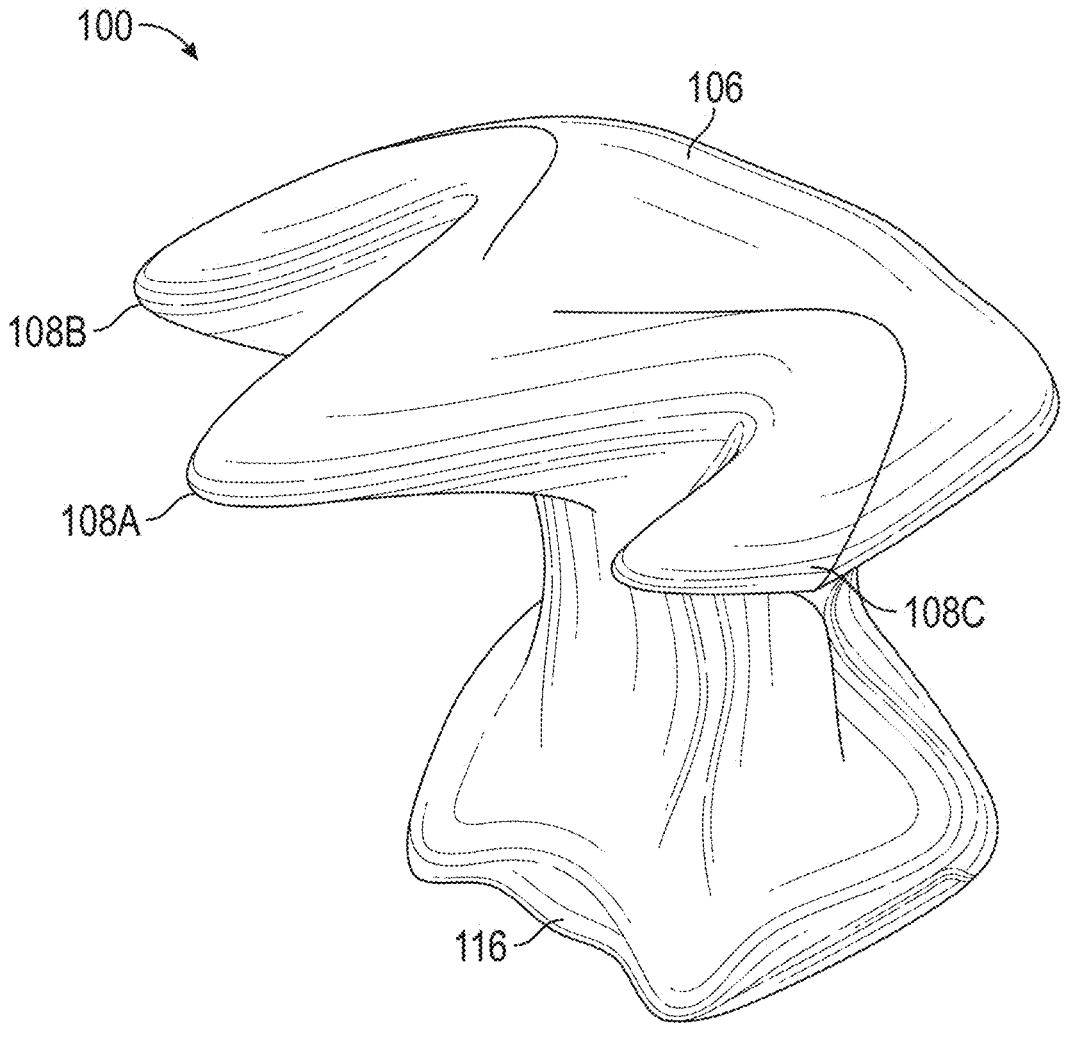
FIG. 1A illustrates a perspective view of a denticle, according to one or more embodiments described herein.
Figure 1B:
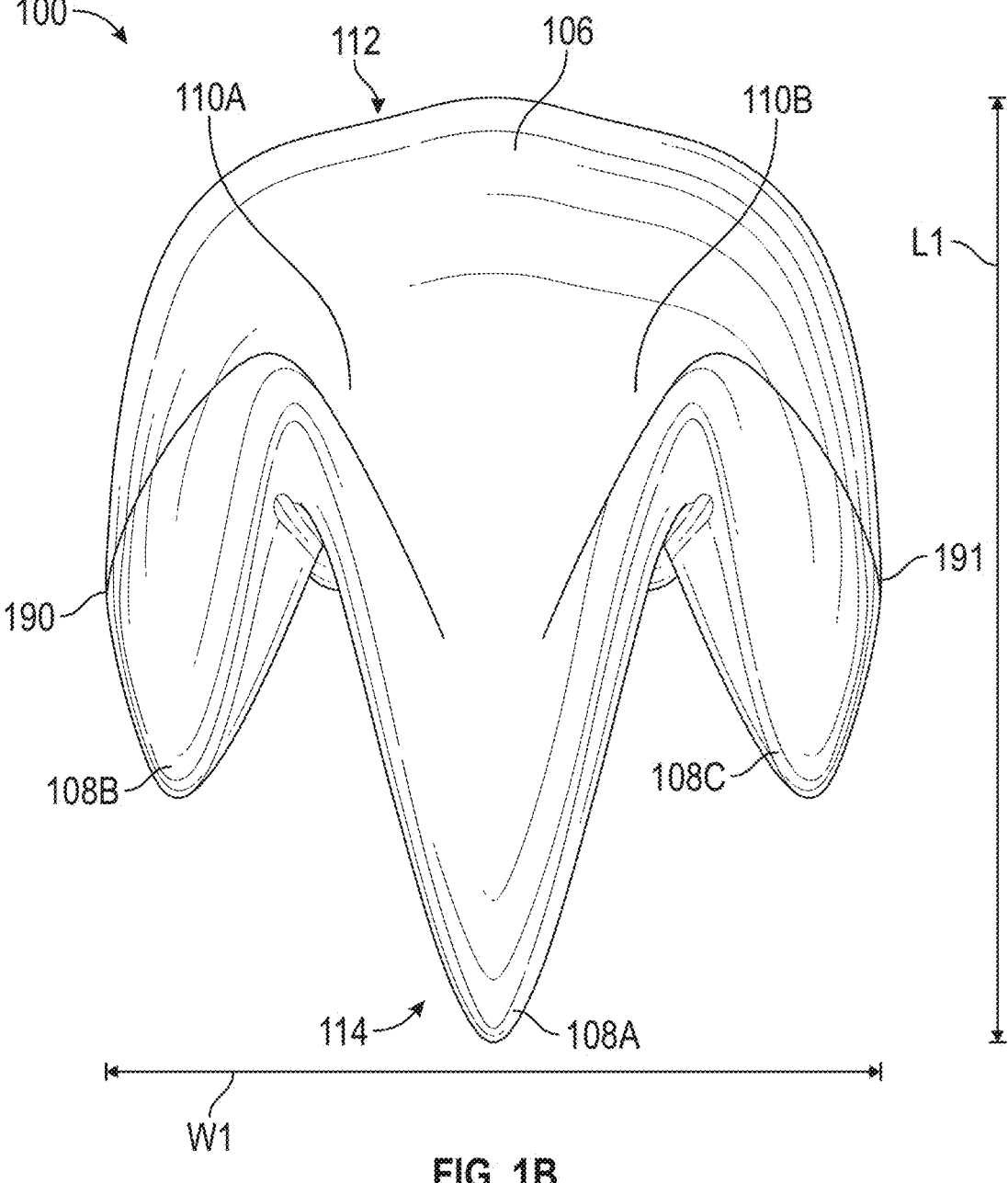
FIG. 1B illustrates a top view of the denticle of FIG. 1A, according to one or more embodiments described herein.
Figure 1C:
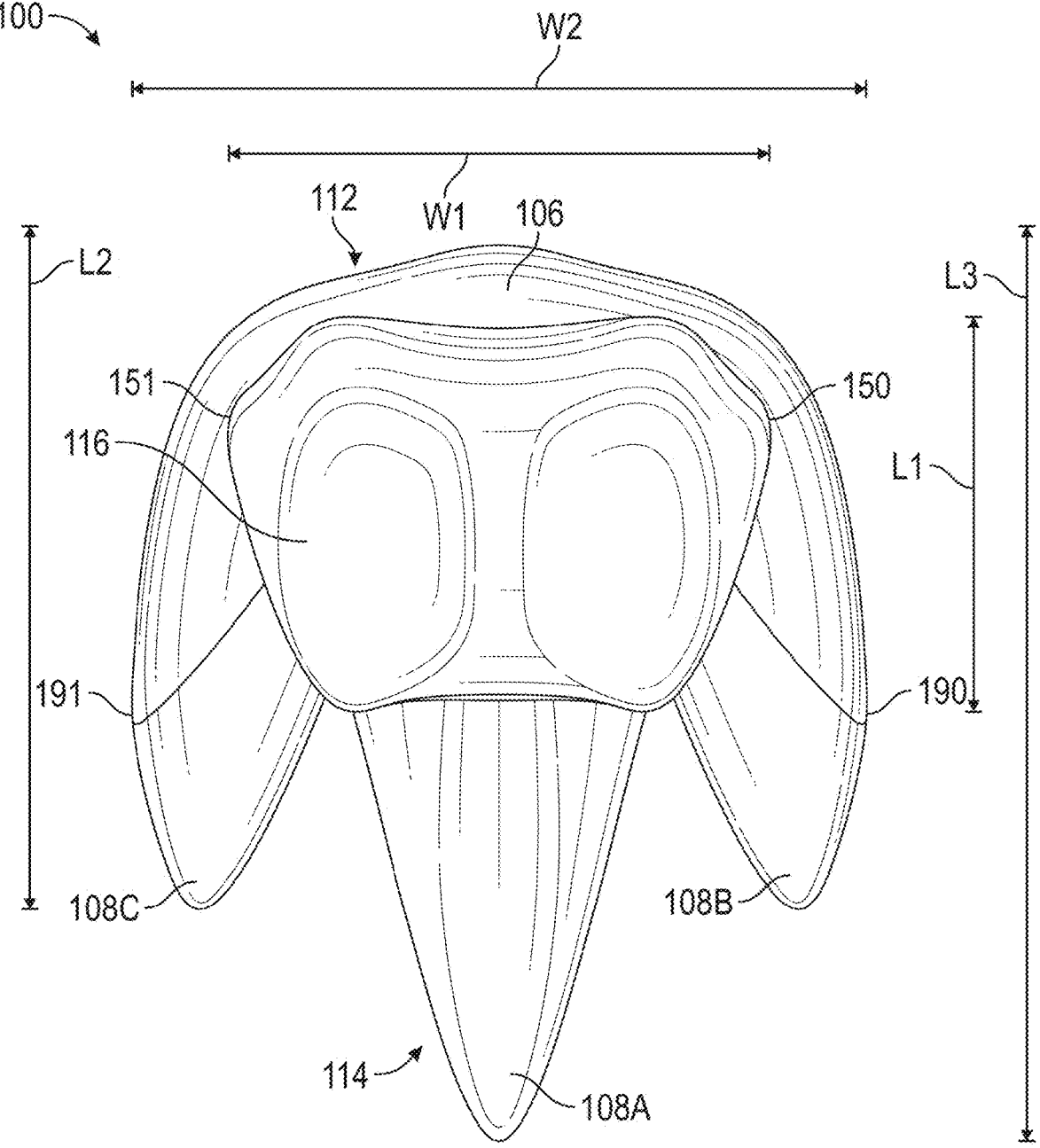
FIG. 1C illustrates a bottom view of the denticle of FIG. 1A, according to one or more embodiments described herein.
Figure 1D:
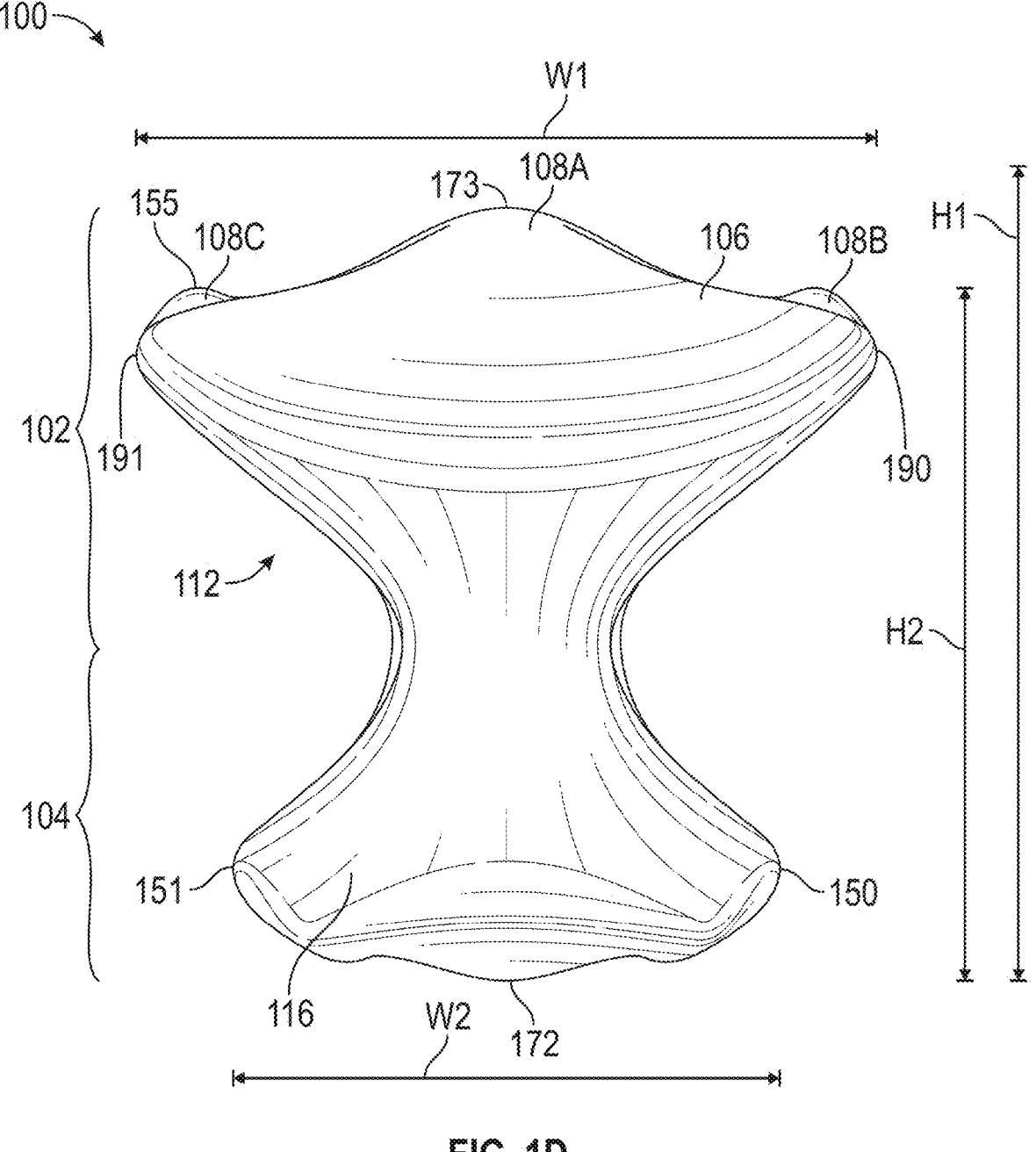
FIG. 1D illustrates a front view of the denticle of FIG. 1A, according to one or more embodiments described herein.
Figure 1E:
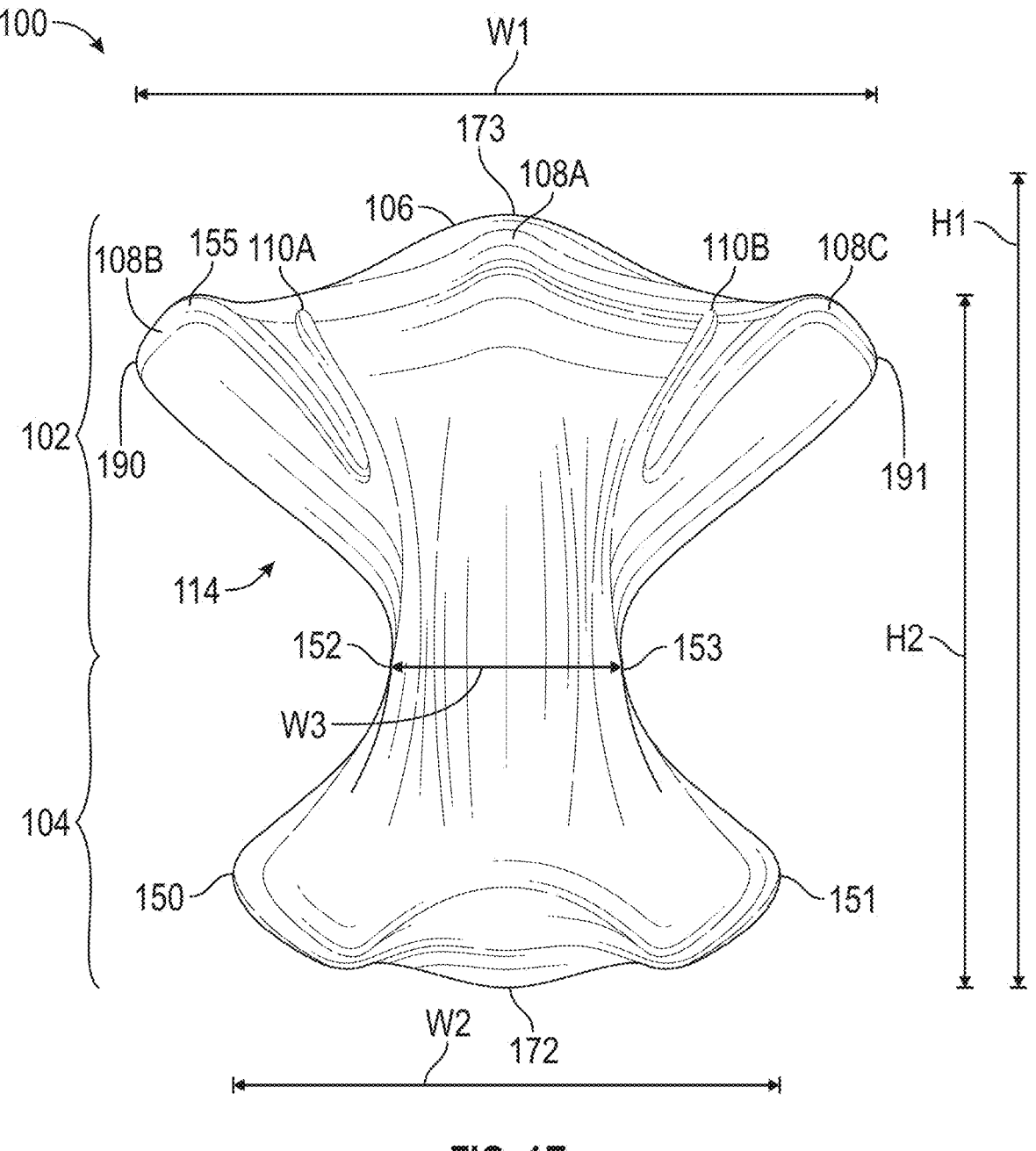
FIG. 1E illustrates a rear view of the denticle of FIG. 1A, according to one or more embodiments described herein.
Figure 1F:
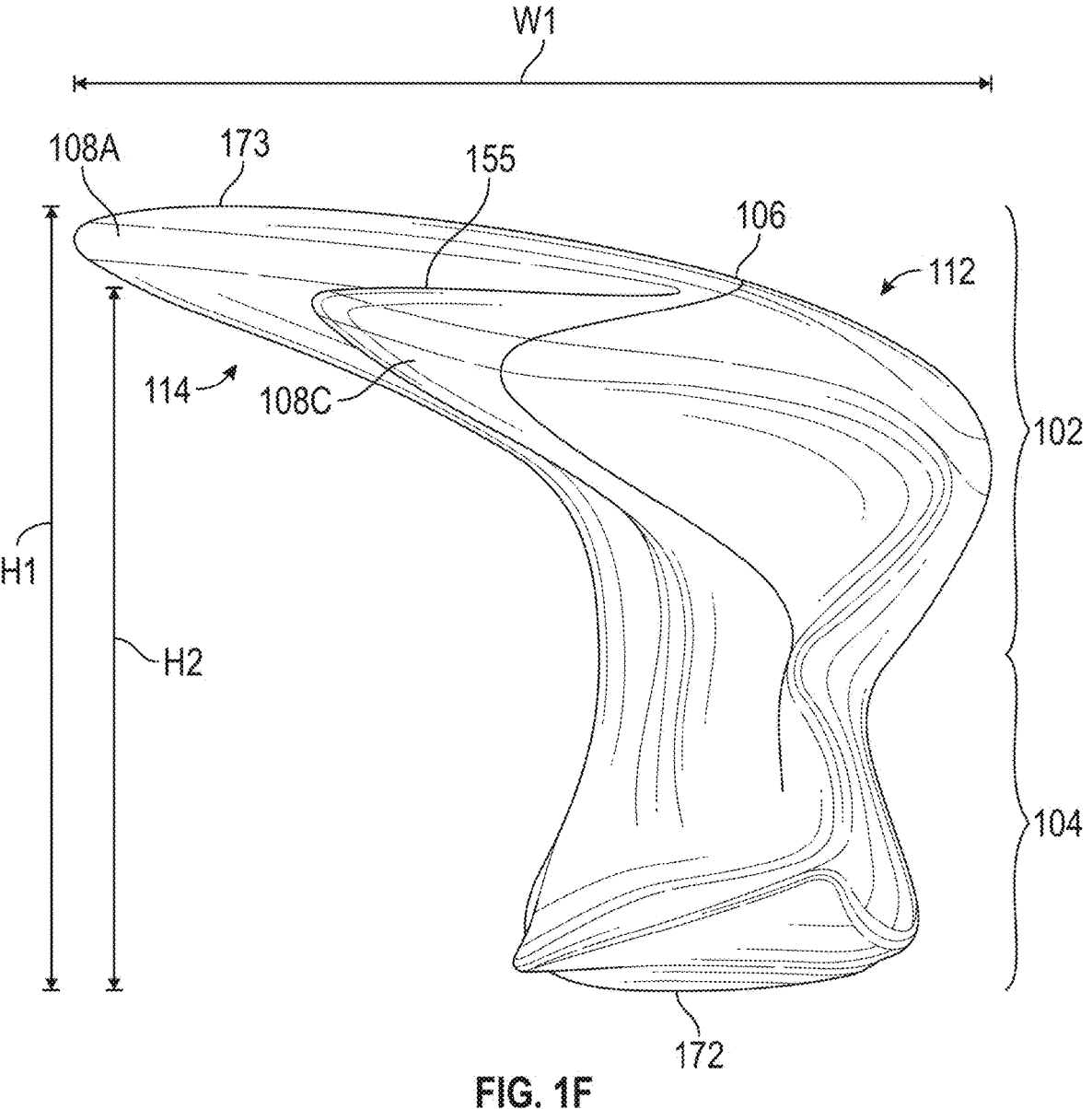
FIG. 1F illustrates a side view of the denticle of FIG. 1A, according to one or more embodiments described herein.

FIG. 1A-FIG. 1F show a shark-skin denticle (e.g., denticle 100). FIG. 1A illustrates a perspective view of a denticle 100. FIG. 1B illustrates a top view of the denticle 100. FIG. 1C illustrates a bottom view of the denticle 100. FIG. 1D illustrates a front view of the denticle 100. FIG. 1E illustrates a rear view of the denticle 100. FIG. 1F illustrates a side view of the denticle 100. The denticle 100 includes an upper portion 102 and a lower portion 104. The lower portion 104 includes a lower body 116. The upper portion 102 includes an upper body 106 including one or more prongs (e.g., a first prong 108A, a second prong 108B, and a third prong 108C) and one or more ridges (e.g., a first ridge 110A and a second ridge 110B). The first prong 108A, second prong 108B, and third prong 108C extend from a front end 112 of the denticle 100 towards a rear end 114 of the denticle 100. The first ridge 110A extends from a front end 112 of the denticle 100 towards the rear end 114 of the denticle 100 between the first prong 108A and second prong 108B. The first ridge 110A separates the first prong 108A from the second prong 108B. The second ridge 110B extends from the front end 112 of the denticle 100 toward the rear end 114 of the denticle 100 between the first prong 108A and the third prong 108C. The second ridge 110B separates the first prong 108A from the third prong 108C. In some embodiments, additional prongs and ridges may be contemplated, e.g. 5 prongs and 4 ridges.

The denticle 100 has a first prong length L1, a second prong length L2, a lower body length L3, an upper body width W1, a lower body width W2, a center width W3, a first height H1, and a second height H2. The first prong length L1 is the distance from the front end 112 of the upper body 106 to the rear end 114 of the first prong 108A (e.g., the front most portion of the upper body 106 to the rearmost portion of the upper body 106). The distance L1 is from about 100 nm to about 5 mm. The second prong length L2 is the distance from the front end 112 of the upper body 106 to the rearmost portion of the second prong 108B or third prong 108C. The second prong length L2 is from about 100 nm to about 5 mm. The first prong length L1 may be greater than the second prong length L2.

The upper body width W1 is the distance from an edge 190 of the second prong 108B to an edge 191 of the third prong 108C. The upper body width W1 is from about 100 nm to about 5 mm. The lower body width W2 is the distance from a first edge 150 of the lower body 116 to a second edge 151 of the lower body 116. The lower body width W2 is from about 100 nm to about 5 mm. The center width W3 is the distance from a first edge 152 of the denticle 100 to a second edge 153 of the denticle 100 at an interface between the upper portion 102 and the lower portion 104. The upper body width W1 may be greater than the lower body width W2 and the center width W3. The lower body width W2 may be greater than the center width W3 and less than the upper body width W1. The upper body width W1 and lower body width W2 may be greater than the center width W3.

The first height H1 is a distance from a bottom surface 172 of the lower body 116 to an upper surface 173 of the first prong 108A. The first height H1 is from about 100 nm and about 5 mm. The second height H2 is a distance from the bottom surface 172 of the lower body 116 to an upper surface 155 of either the second prong 108B or the third prong 108C. The second height H2 is from about 100 nm to about 5 mm. The first height H1 may be greater than the second height H2.

The denticle 100 may be fabricated polymer material, such as polycarbonate (PC), acrylonitrile butadiene styrene (ABS), elastomeric polyurethane (PU), silicone, acrylate-based resins, combinations thereof, or other suitable elastomeric materials and polymers. The denticle 100 may be fabricated of a textile material. In some embodiments, the elastomeric material of the denticle 100 may be doped with a metallic material. In other embodiments, the elastomeric material may be encapsulated with a film of metallic material. The metal film may have a thickness from about 5 nm to about 25 nm. The metallic material may include gold (Au), silver (Ag), copper (Cu), iron (Fe), molybdenum (Mo), zinc (Zn), titanium (Ti), combinations thereof, or other suitable metallic material.

FIGS. 2A-2E illustrate top views of different denticle arrays. In one embodiment, the denticle arrays may be a textile material or applied to a textile substrate. A plurality of denticles 100 are disposed over a substrate 205. The substrate 205 may have a thickness from about 0.1 mm to about 5 mm. The substrate 205 may include an elastomeric material, such as polycarbonate (PC), acrylonitrile butadiene styrene (ABS), elastomeric polyurethane (PU), silicone, acrylate-based resins, combinations thereof, or other suitable elastomeric materials and polymers. In some embodiments, the elastomeric material of the substrate 205 may be doped with a metallic material. In other embodiments, the elastomeric material may be encapsulated with a film of metallic material. The metal film may have a thickness from about 5 nm to about 25 nm. The metallic material may include gold (Au), silver (Ag), copper (Cu), iron (Fe), molybdenum (Mo), zinc (Zn), titanium (Ti), combinations thereof, or other suitable metallic material. The denticle density on the substrate 205 (e.g., the number of denticles 100 per unit of area of the substrate 205) is from about 40 denticles/cm$^2$ to about 160 denticles/cm$^2$. Each denticle 100 on the denticle array has an alignment angle with respect to a plane of a first direction (e.g., Direction A).

Figure 2A:
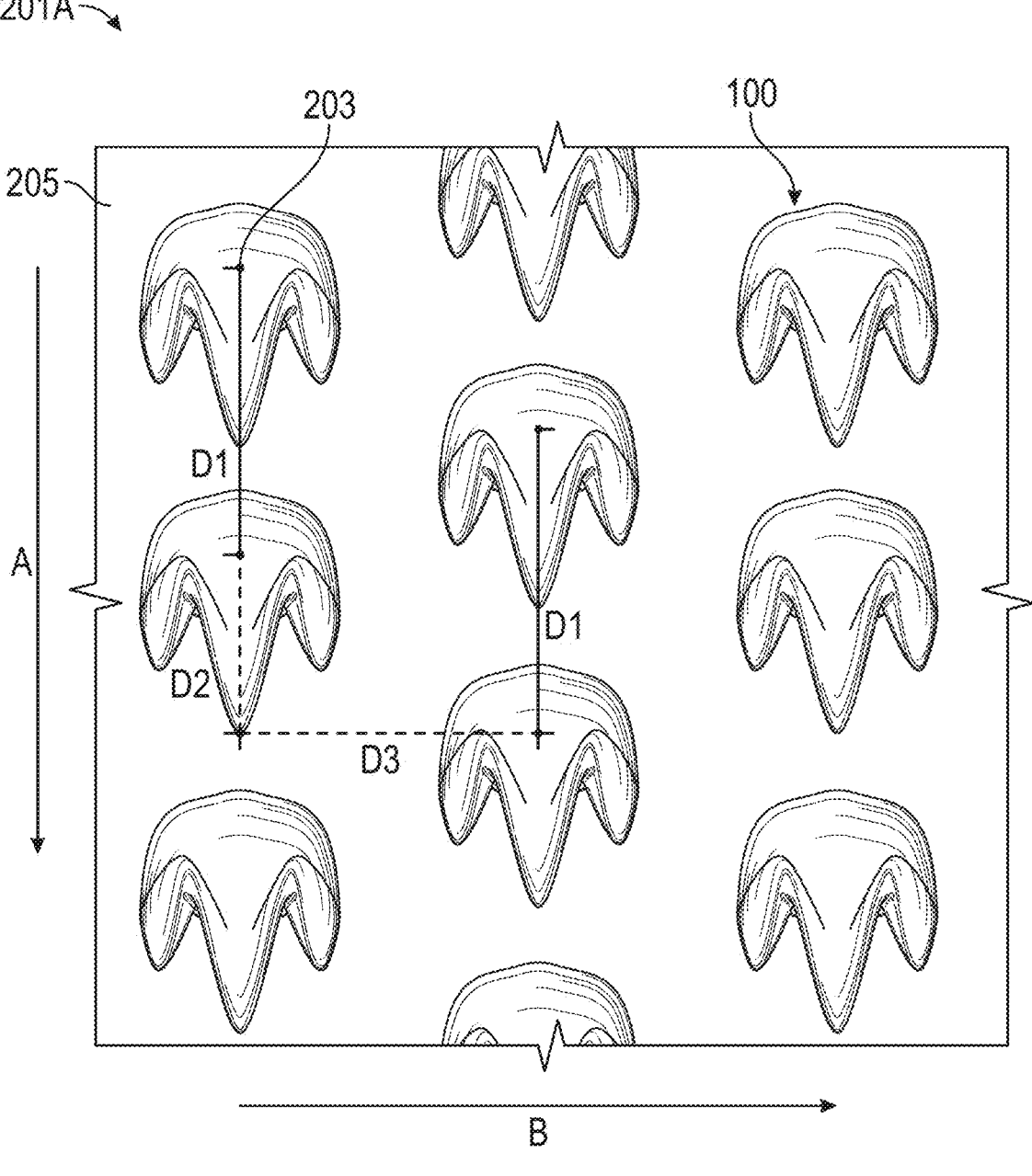
FIG. 2A illustrates a top view of an offset denticle array, according to one or more embodiments described herein.

FIG. 2A illustrates a top view of an offset denticle array 201A. The denticles 100 are arranged in an offset array on the substrate 205. Adjacent denticles 100 are spaced apart in Direction A by a distance D1. The distance D1 is the distance from a center point 203 of the denticle 100 to the center point 203 of the adjacent denticle 100. The distance D1 is from about 100 nm to about 5 mm. Adjacent denticles 100 are offset from each other in the Direction A by a distance D2. The distance D2 is the distance from the center point 203 of a denticle 100 to a plane perpendicular to Direction A which intersects the center point 203 of an adjacent denticle 100. The distance D2 may be from about 0.5 nm to about 2.5 mm. Adjacent denticles 100 are spaced apart in a second direction (e.g., Direction B) by a distance D3. The distance D3 is the distance from a center point 203 of the denticle 100 to the center point 203 of the adjacent denticle 100. The distance D3 is from about 100 nm to about 5 mm.

Figures 2B, 2C, 2D, 2E:
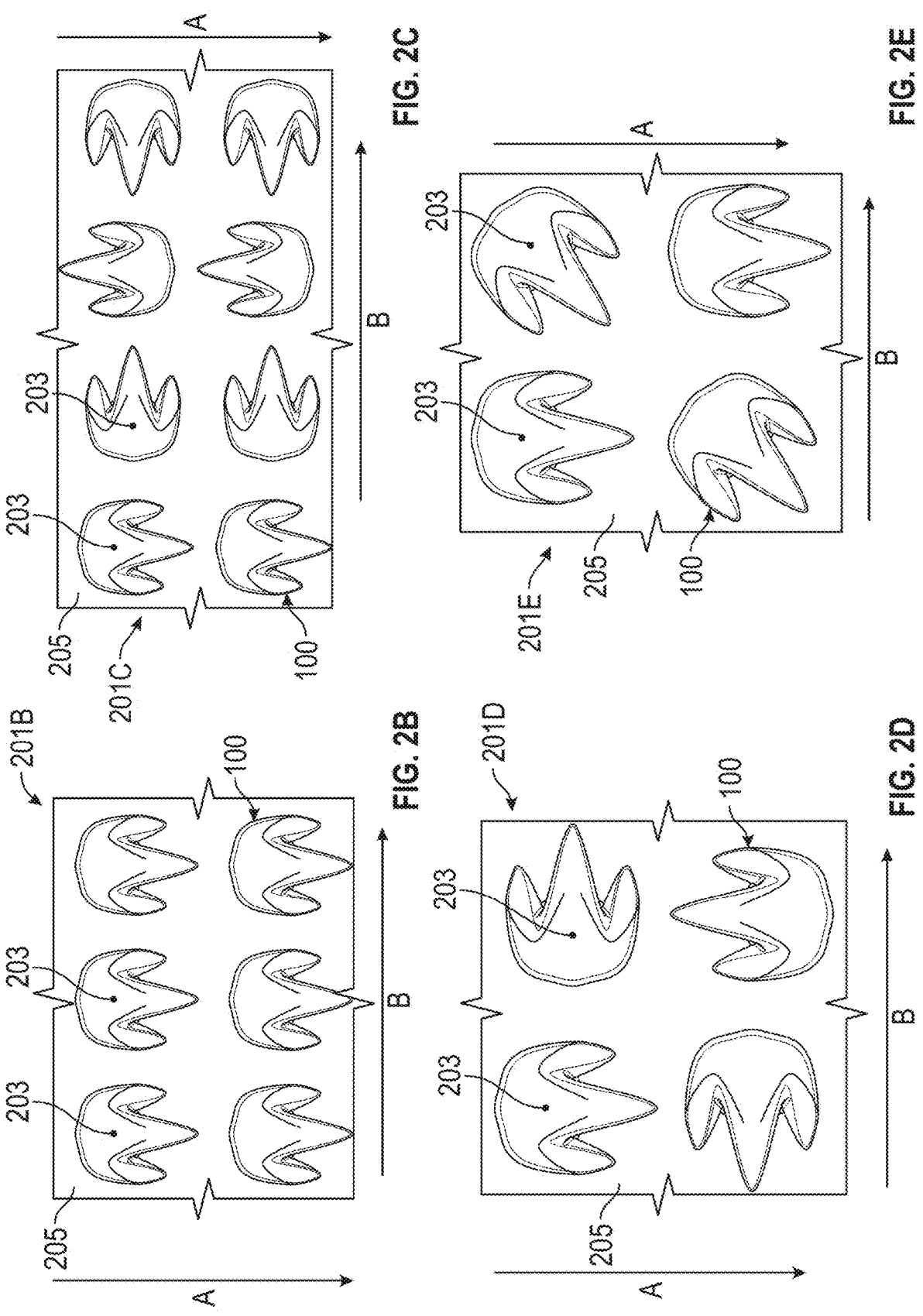
FIG. 2B illustrates a top view of an aligned denticle array, according to one or more embodiments described herein.
FIG. 2C illustrates a top view of a rotating column denticle array, according to embodiments.
FIG. 2D illustrates a top view of a rotating angle denticle array, according to one or more embodiments described herein.
FIG. 2E illustrates a top view of a rotating angle denticle array, according to one or more embodiments described herein.

FIG. 2B illustrates a top view of an aligned denticle array 201B. The denticles 100 are arranged in an aligned array on the substrate 205. The aligned denticle array 201B has a distance D2 of about 0 nm (e.g., the adjacent denticles 100 have center points 203 aligned along Direction B).

FIG. 2C illustrates a top view of a rotating column denticle array 201C. Each column of the array 201C has denticles 100 aligned at an angle different from the adjacent rows. The alignment angle may change between the adjacent columns by about 1° to about 359°. In the illustrated embodiment, each column is rotated 90° from the immediately adjacent column. In other embodiments, the change in the alignment angle between every other column may be 0° (e.g. every other column has the same alignment angle).

FIG. 2D illustrates a top view of a rotating denticle array 201D. FIG. 2E illustrates a top view of a rotating angle denticle array 201E. Each denticle 100 of the denticle array is aligned at a different angle from the adjacent denticles. The alignment angle of the denticle 100 may change between the adjacent denticles 100 by about 1° to about 359°. In the rotating denticle array 201D embodiment of FIG. 2D, each denticle 100 is rotated 90° from the immediately adjacent denticle 100. In the rotating angle denticle array 201E embodiment of FIG. 2E, each denticle 100 is rotated 45° from the immediately adjacent denticle 100. In some embodiments, the alignment angle between two or more immediately adjacent denticles 100 does not change.

In some embodiments, as shown in FIG. 2A and FIG. 2B, the adjacent denticles in the denticle array are aligned in a uniform direction. In the illustrated embodiments, the first prong 108A, second prong 108B, and third prong 108C extend from the front end 112 to the rear end 114 of the denticle 100 in the Direction A (e.g., the alignment angle is 0°). Alignment of the denticles 100 in a uniform direction decreases drag of air, water, or other fluids past the denticle 100 in the alignment direction (e.g., Direction A). Thus, drag reduction enables materials having the denticles 100 applied thereon to more efficiently pass through one or more fluid mediums which increases energy efficiency and performance.

In other embodiments, as shown in FIG. 2C, FIG. 2D, and FIG. 2E, adjacent denticles are non-uniformly aligned, e.g., the first prong 108A, second prong 108B, and third prong 108C do not extend from the front end 112 to the rear end 114 of the denticle 100 in a uniform direction (the alignment angle is greater than 0°). Non-uniform alignment of the denticles 100 leads to increased drag/friction across the substrate 205, creating a substrate 205 which exhibits enhanced friction against a surface applied to the substrate 205 with force in one or more directions. For example, improved adherence or gripping performance may be realized when utilizing the non-uniform alignment of the denticles 100.

When force is applied along the Direction A, a denticle array has a tensile strength from about 3 MPa to about 10 MPa, a Young's modulus from about 5 MPa to about 15 MPa, and an elongation at break of about 100% to about 250%. When tested along the Direction B, the denticle array has a tensile strength from about 4 MPa to about 15 MPa, a Young's modulus from about 5 MPa to about 20 MPa, and an elongation at break of about 100% to about 250%.

The denticle array exhibits increased anti-microbial properties compared to a control and other conventional anti-microbial materials (e.g., aluminum, copper). The denticle 100 having a first prong 108A, second prong 108B, and third prong 108C may prevent external objects from attaching to the surface of the denticle 100 and the substrate 205, resulting in prevention of bacterial contamination, breeding, or other biofouling. The anti-microbial properties are enabled by the riblet structure that contains a thin air layer between the prongs and the substrate 205. The air layer acts as a buffer or barrier to prevent the adhesion of bacteria. Further, as the size of the denticle 100 on the denticle array decreased, the anti-microbial properties increased. Thus, there is an inverse relationship between the denticle size and the anti-microbial performance. When doped with or encapsulated by metallic materials, the anti-microbial properties of the denticle 100 may be further improved.

The denticle array having the denticle 100 with a first prong 108A, second prong 108B, and third prong 108C prevents vortexes or turbulence in fluid flow from forming. The improved laminar flow of fluid over the denticles 100 may prevent the denticle 100 from breaking off of the surface of the substrate 205. Hence, the denticles 100 on the denticle array can reduce the dragging force across the denticle array. Thus, drag reduction enables materials having the denticles 100 applied thereon to more efficiently pass through one or more fluid mediums which increases energy efficiency and performance.

Uses

Embodiments of the present disclosure also generally relate to uses for the denticle array described herein. The denticle array described herein, when the denticles 100 are aligned, can be used in functional clothing and other applications, and exhibit desirable drag reductions and anti-microbial properties. Further, the denticle array described herein, when the denticles 100 are not aligned, can be functional as a grip in fields such as biomedicine, due to the gripping and anti-microbial properties. Generally, the denticles 100 and denticle array can be 3D printed to form the desired articles.

Illustrative, but non-limiting applications include swimsuits, tactical equipment, outdoor clothing, grips for surgical and other tools, fashion, protective clothing, and sportswear.

The following examples are put forth so as to provide those of ordinary skill in the art with a complete disclosure and description of how to make and use embodiments of the present disclosure, and are not intended to limit the scope of embodiments of the present disclosure.

EXAMPLES

Test Methods

Denticles 100 described herein are three dimensional (3D) elements which were designed utilizing various software tools. In one example, the 3D models of the denticles 100 were developed with Meshmixer software (available from Autodesk, Inc.) and 3D Builder software (available from Microsoft Corporation). Further details of the denticle 100 were developed using Catia software (available from Dassault Systemes SE).

Mechanical analysis was performed, in some experiments, using an Instron 3400 series low force universal testing system with testing capacity from 2N-50N using ASTM D882 standard. Mechanical analysis was performed, in other experiments, using an Instron 4442 Mechanical Tester using ASTM standard D412-16 (2021) (Standard Test Methods for Vulcanized Rubber and Thermoplastic Elastomers-Tension).

Antimicrobial properties were tested using the "immersion assay" test protocol presented in Mann et al. (2014) "Surface micropattern limits bacterial contamination. *Antimicrobial resistance and infection control*, 3(1), 1-9." *E. coli* ATCC25922 was used in the antimicrobial properties testing. Statistical analysis was performed using ANOVA tests. The incubator was a Fisher incubator (available from Thermo Fisher Scientific). The area covered by the bacteria was measured using Image J software.

A Form3 3D printer was used to fabricate the denticles 100 and denticle array. A photo-polymerization method is utilized on the Form3 3D to fabricate the samples. The Form3 3D printer has a resolution of 25 microns on the X-axis and Y-axis.

A Motic Digital Microscope DMB3-223 was used to take optical microscope micrographs of the denticles 100 and denticle array.

Stiffness testing was tested according to AATCC TM66 (Test Method for Wrinkle Recovery of Woven Fabrics: Recovery Angle) and ASTM Standard D1388-08 (Standard Test Method for Stiffness of Fabrics). Statistical analysis was performed using analysis of variance (ANOVA) tests.

The stress-strain curve and load-extension curve were recorded by Bluehill 2.0 software.

EXPERIMENTAL

Experiment 1

Figures 3A, 3B, 3C:
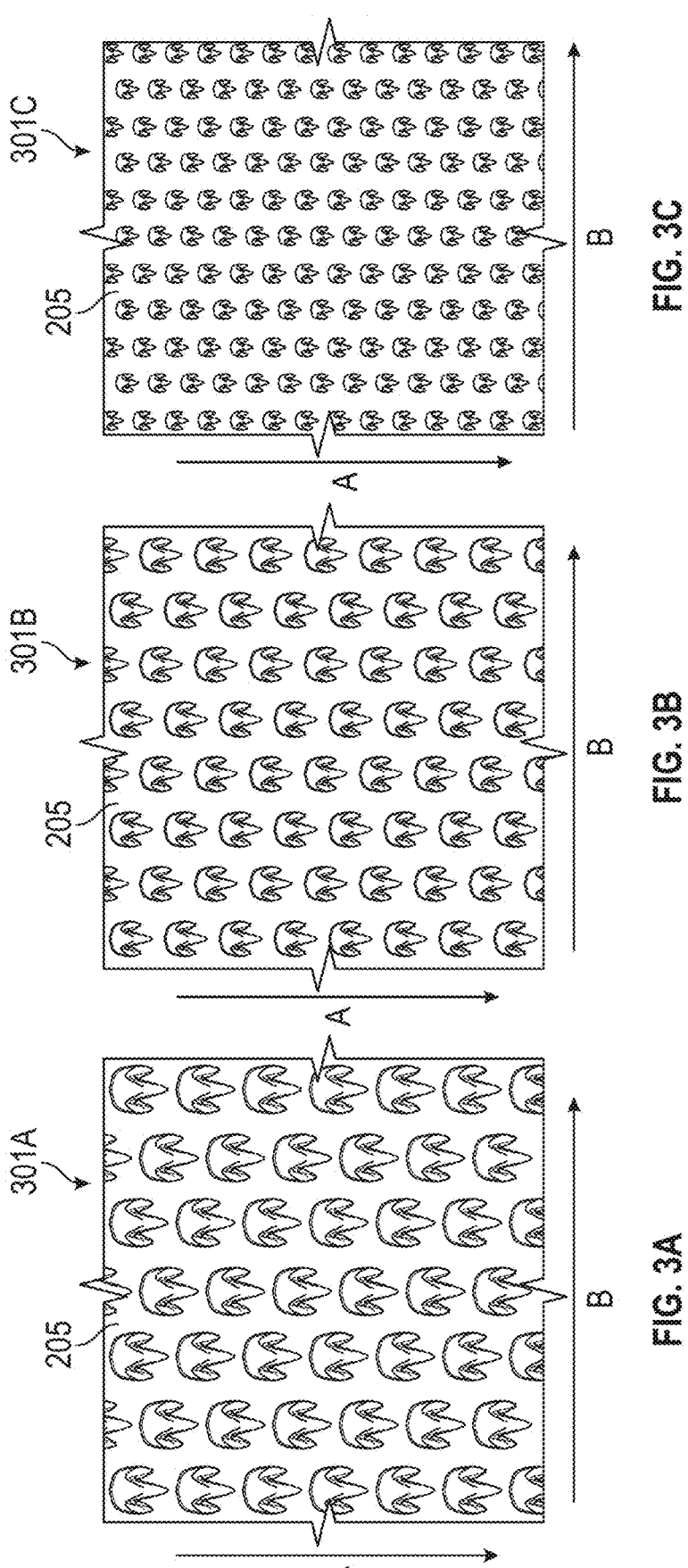
FIG. 3A illustrates an array of large size denticles, according to one or more embodiments described herein.
FIG. 3B illustrates an array of medium size denticles, according to one or more embodiments described herein.
FIG. 3C illustrates an array of small size denticles, according to one or more embodiments described herein.

FIG. 3A illustrates an array of large size denticles 301A. FIG. 3B is an array of medium size denticles 301B. FIG. 3C is an array of small size denticles 301C. The large size denticle array 301A, medium size denticle array 301B, and small size denticle array 301C are arranged into a offset denticle array, as shown in FIG. 2A, on a 50 mm×30 mm×0.3 mm substrate 305 (length×width×thickness). Three substrate samples were fabricated. Table 1 shows the dimensions of the denticles 100 on the large size denticle array 301A, the medium size denticle array 301B, and the small size denticle array 301C.

TABLE 1

Denticle dimensions and spacing between denticles on the substrate

|  | Large Size Denticle Array | Medium Size Denticle Array | Small Size Denticle Array |
|---|---|---|---|
| Length (mm) | 1.3 | 1.04 | 0.65 |
| Width (mm) | 1.06 | 0.85 | 0.53 |
| Height (mm) | 1.02 | 0.82 | 0.53 |
| D1 (mm) | 1.5 | 1.25 | 0.8 |
| D2 (mm) | 0.75 | 0.625 | 0.4 |
| D3 (mm) | 1.5 | 1.25 | 0.8 |

Figures 4A, 4B, 4C:
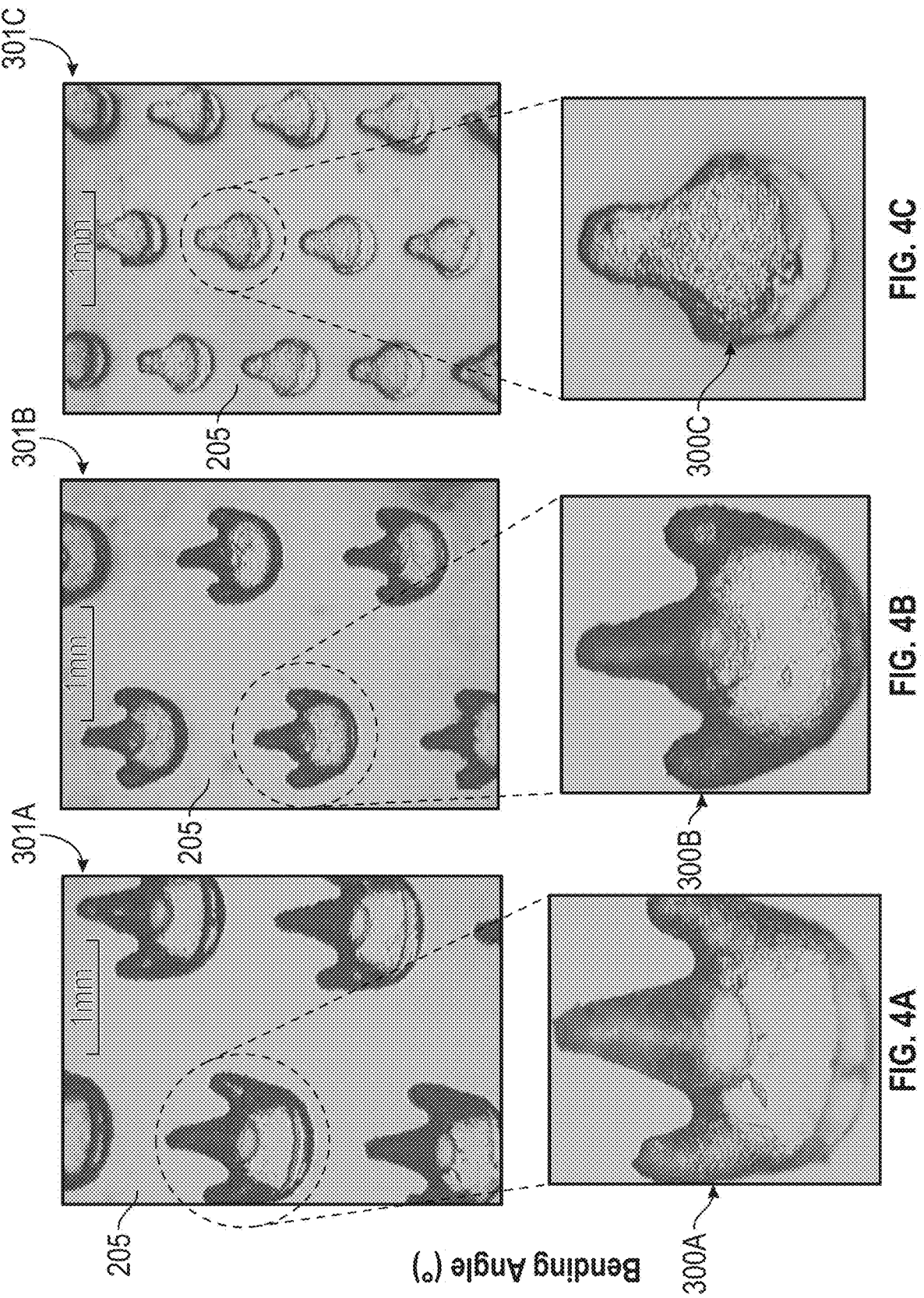
FIG. 4A is a micrograph illustrating the array of large size denticles and a large size denticle of the large size denticle array, according to one or more embodiments described herein.
FIG. 4B is a micrograph illustrating the array of medium size denticles and a medium size denticle of the medium size denticle array, according to one or more embodiments described herein.
FIG. 4C is a micrograph illustrating the array of small size denticles and a small size denticle of the small size denticle array, according to one or more embodiments described herein.

FIG. 4A is a micrograph illustrating the large size denticle array 301A and a large size denticle 300A of the large size denticle array 301A. FIG. 4B is a micrograph illustrating the medium size denticle array 301B and a medium size denticle 300B of the medium size denticle array 301B. FIG. 4C is a micrograph illustrating the small size denticle array 301C and a small size denticle 300C of the small size denticle array 301C.

Figures 5, 6:
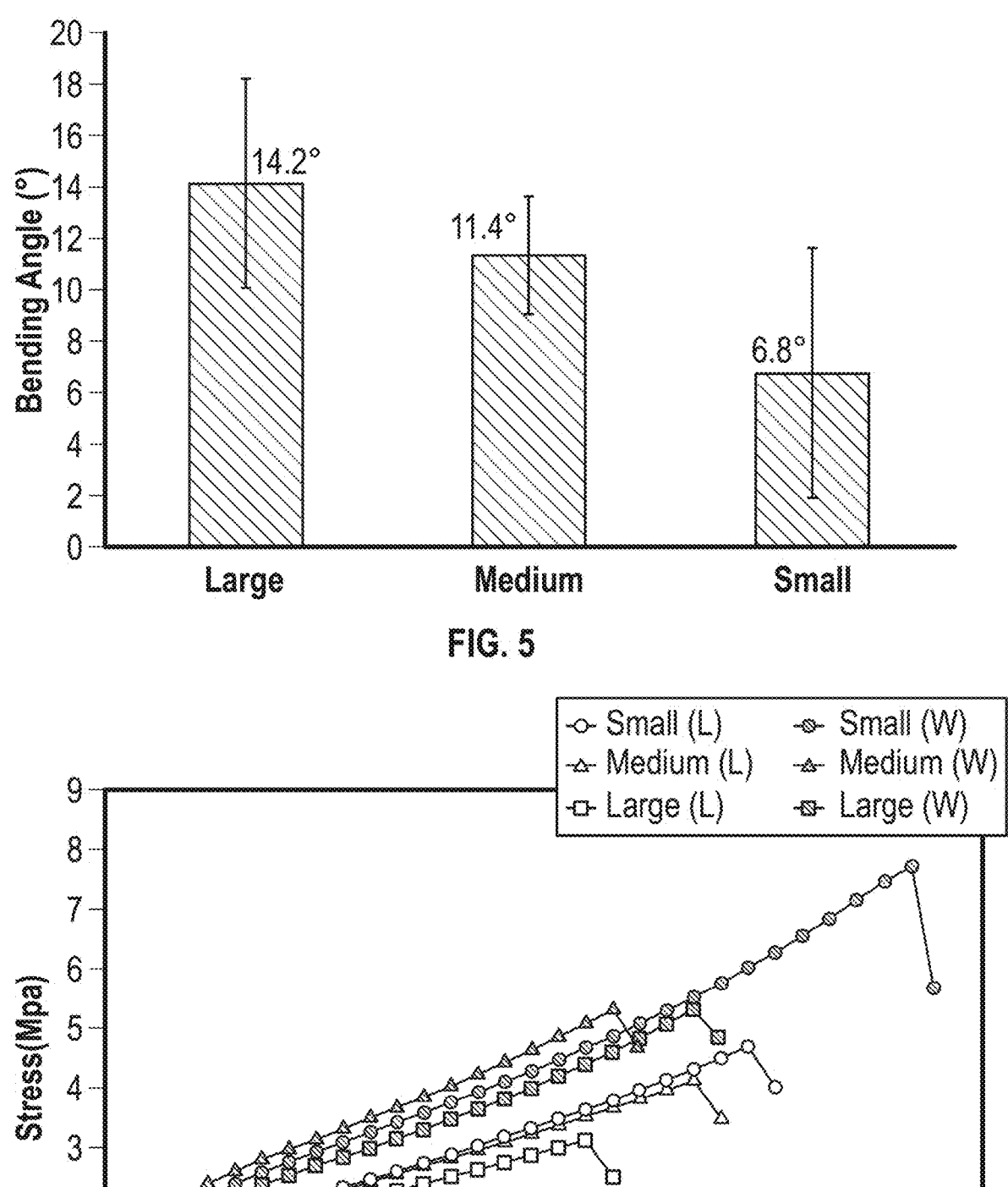
FIG. 5 is a graph illustrating results of wrinkle recovery test data, according to one or more embodiments described herein.
FIG. 6 is a graph illustrating stress-strain curve data of the denticle arrays, according to one or more embodiments described herein.

FIG. 5 is a graph illustrating results of the wrinkle recovery test. The smaller the angle of bending, the stiffer the sample. Each result was the average of five specimens. The denticle size and denticle density illustrates a statistically significant effect on the stiffness of the samples. The fabric with the large size denticles 300A had the largest bending angle, suggesting it was the softest fabric. The fabric with the small size denticles 300C showed the smallest bending angle, suggesting the stiffest fabric. However, those results are also associated with the difference in denticle density due to the differences in denticle size. The denticle density is the number of denticles per unit area of fabric. Fabrics with small size denticles 300C have a high denticle density and small spaces between small size denticles 300C. Therefore, the overall thickness of the small size denticle array 301C is larger than the medium size denticle array 301B or large size denticle array 301A, making bending more difficult and resulting in a small bending angle in the small size denticle array 301C.

FIG. 6-9 illustrate the results of mechanical analysis performed on the denticle arrays described herein. The mechanical properties of the denticle arrays were tested according to ASTM D412-16. The denticle arrays was tested along Direction A and Direction B. Each result was the average of five specimens.

Figure 7:
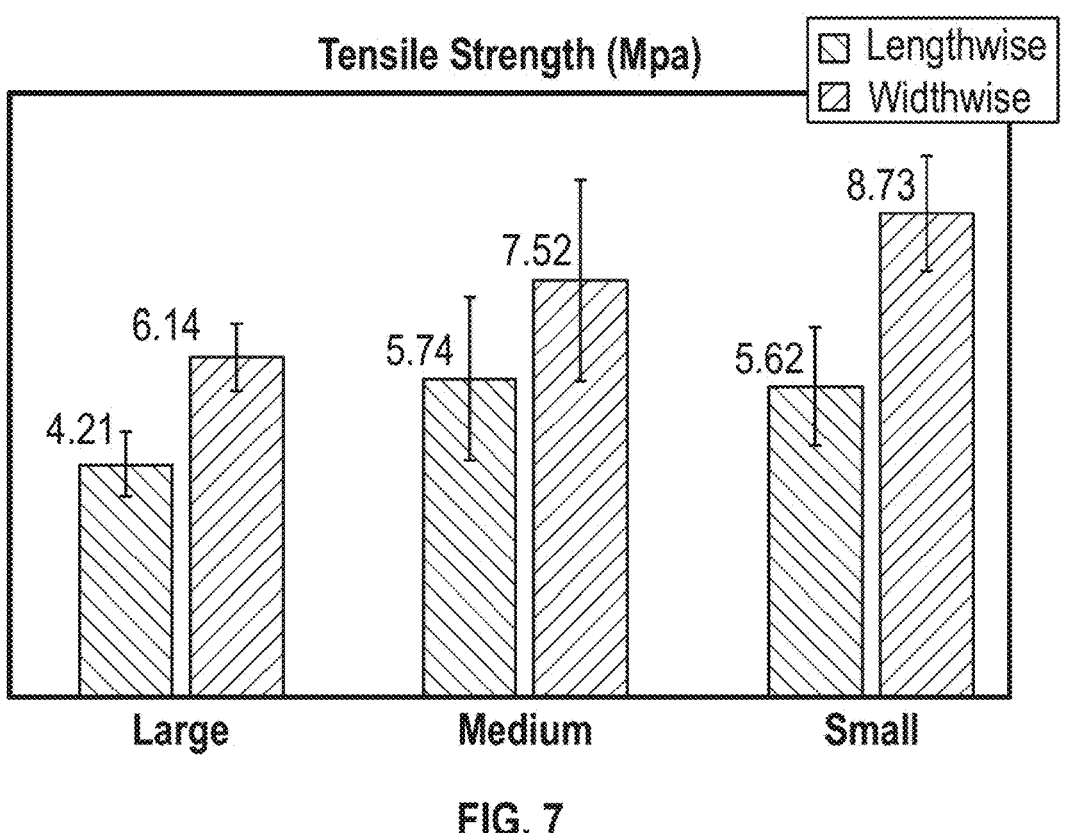
FIG. 7 is a graph illustrating tensile strength data of the denticle arrays, according to one or more embodiments described herein.
Figure 8:
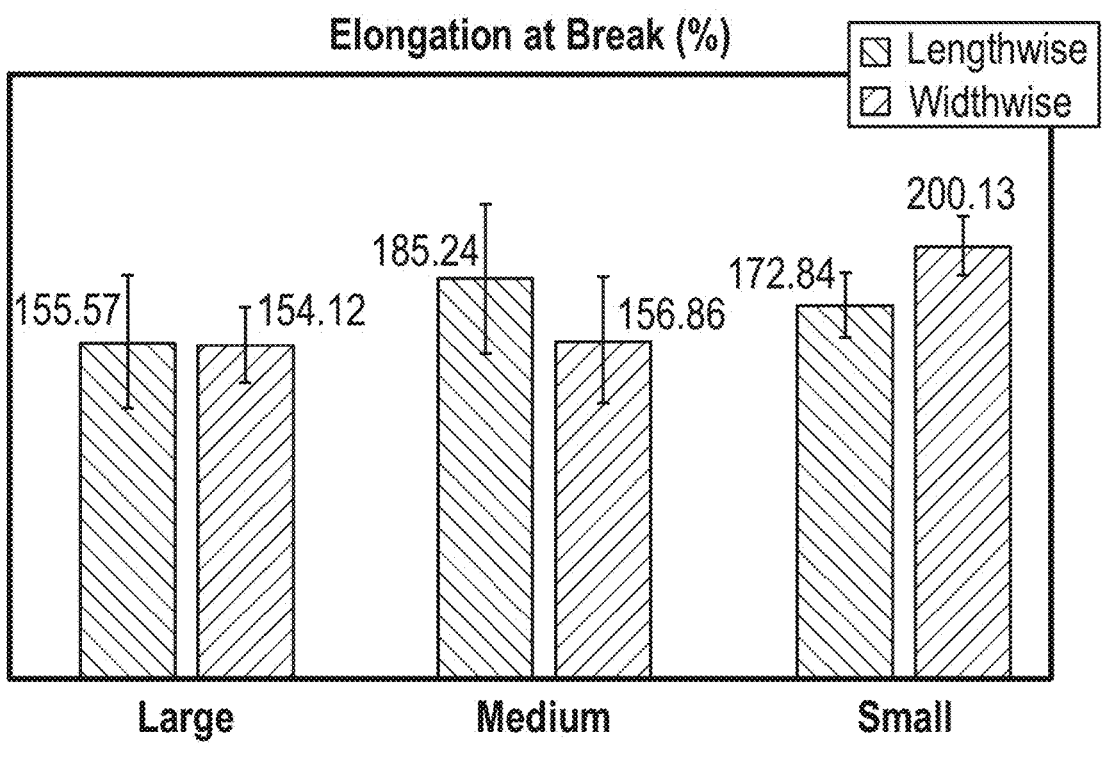
FIG. 8 is a graph illustrating elongation at break (%) data of the denticle arrays, according to one or more embodiments described herein.
Figures 9, 10A, 10B, 10C, 10D:
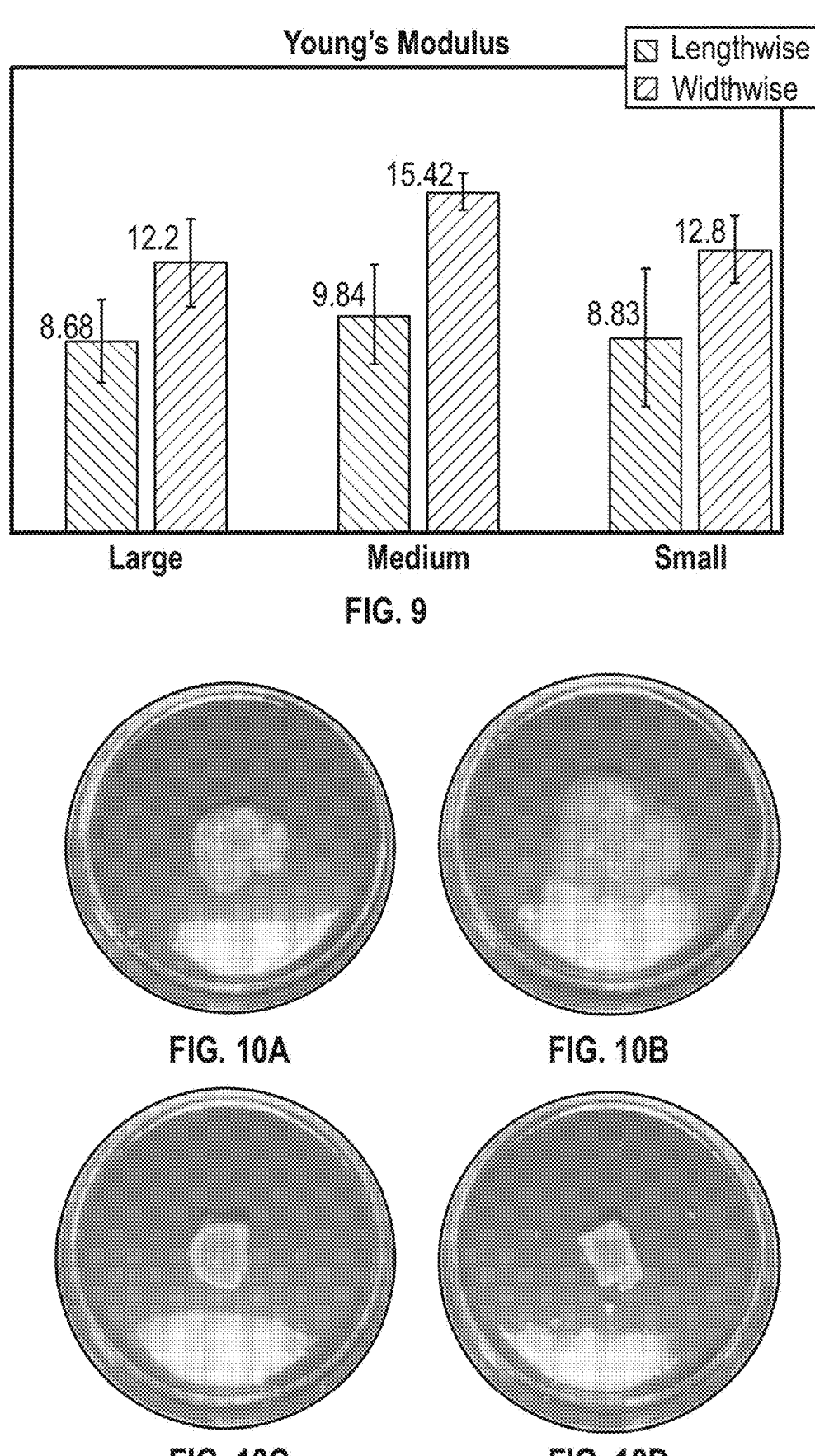
FIG. 9 is a graph illustrating Young's modulus data of the denticle arrays, according to one or more embodiments described herein.
FIG. 10A is a photograph illustrating *E. coli* growth on a control sample, according to one or more embodiments described herein.
FIG. 10B is a photograph illustrating *E. coli* growth on a large size denticle array, according to one or more embodiments described herein.
FIG. 10C is a photograph illustrating *E. coli* growth on a medium size denticle array, according to one or more embodiments described herein.
FIG. 10D is a photograph illustrating *E. coli* growth on a small size denticle array, according to one or more embodiments described herein.

FIG. 6 is a graph illustrating stress-strain curve of the denticle arrays. FIG. 7 is a graph illustrating tensile strength of the denticle arrays. FIG. 8 is a graph illustrating elongation at break (%) of the denticle arrays. FIG. 9 is a graph illustrating Young's modulus of the denticle arrays. Table 2 is a summary of the mechanical properties of the denticle arrays.

TABLE 2

Summary of the Mechanical Properties of the Denticle Arrays

| Size (Direction) | Tensile Strength (MPa) | Young's Modulus (MPa) | Elongation at Break (%) |
|---|---|---|---|
| Large Size Denticle (Direction A) | 4.21 | 8.68 | 155.57 |
| Large Size Denticle (Direction B) | 6.14 | 12.2 | 154.12 |
| Medium Size Denticle (Direction A) | 5.74 | 9.84 | 185.24 |
| Medium Size Denticle (Direction B) | 7.52 | 15.42 | 156.86 |
| Small Size Denticle (Direction A) | 5.62 | 8.83 | 172.84 |
| Small Size Denticle (Direction B) | 8.75 | 12.8 | 200.13 |

All denticle arrays show increased mechanical properties along Direction B when compared to Direction A. The difference between mechanical properties along Direction A and Direction B indicates mechanical anisotropy in the denticle arrays. The greatest tensile strength and elongation at break of the samples was found to be in Direction B of the small size denticle array 301C. Increasing the denticle size from the small size denticle array 301C to the large size denticle array 301A, the tensile strength decreased 29.67% from 8.73 MPa to 6.14 MPa. Increasing the denticle size was from the medium size denticle array 301B to the large size denticle array 301A, the tensile strength decreased by 18.35% from 7.52 MPa to 6.14 MPa. Therefore, the tensile strength increases along Direction B with a decrease in the denticle size.

However, in Direction A, the medium size denticle array 301B had the highest tensile strength and elongation at break. The medium size denticle array 301B also had greatest Young's Modulus in Direction A and Direction B, suggesting high stiffness in Direction A and Direction B.

The results indicate that the denticle arrays may be integrated into competitive and commercial swimwear designs. Fabrics are typically anisotropic due to the weaving structure and fiber content. Therefore, the anisotropy of the denticle arrays is not an obstacle to applications as a functional clothing element. The maximum tensile strength of commonly used fabrics, such as nylon or polyester fibers, is around 5.4 MPa. The minimum tensile strength of the medium size denticle array 301B was 5.74 MPa. The maximum elongation over the denticle arrays was from 154% to 200%, while the maximum elongation of commonly used nylon-spandex is only 40%. Therefore, the denticle arrays had higher tensile strength and elongation than commonly used fabrics.

Figure 11:
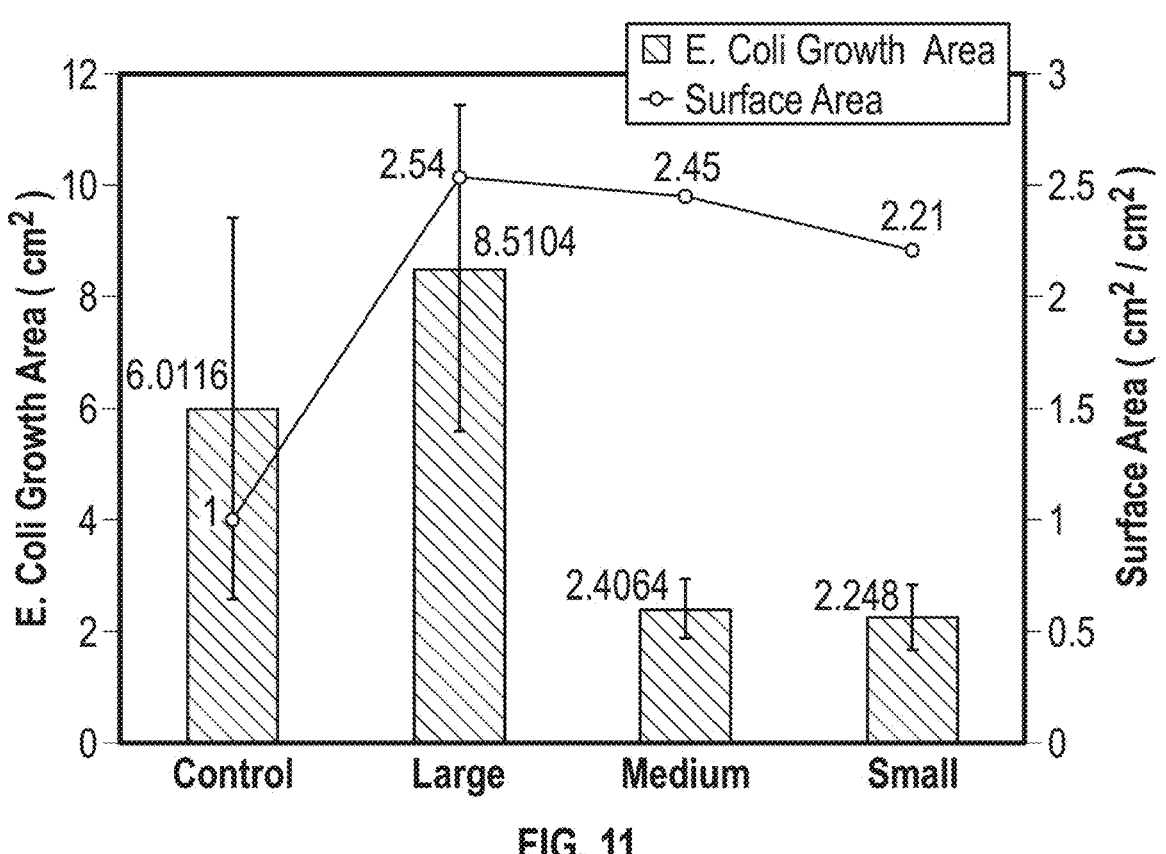
FIG. 11 is a graph illustrating *E. coli* growth area, according to one or more embodiments described herein.

FIGS. 10 and FIG. 11 show the results of the anti-microbial test. The anti-microbial properties of the denticle arrays with different sizes of denticles were evaluated using an immersion inoculation assay method. The prevention of bacterial growth was measured by the area occupied by bacteria after incubation.

A 3D printed fabric with smooth surfaces (e.g., no denticles) was used as a control sample in the tests against the small size denticle array 301C, the medium size denticle array 301B, and the large size denticle array 301A. All 3D printed fabric samples were cut into 1 cm/1 cm squares. Five replicates for each samples were used for statistical analysis.

A Luria Broth (LB) culture media solution was used to inoculate and dilute an *E. coli* ATCC25922 samples. The LB solution was made from 950 ml of deionized (DI) water, 9.5 g of tryptone, 4.75 of NaCL, and 4.75 g of yeast extract. The solution was autoclaved at 273° F. and 28 psi for 1 hour. Two premade $E.$ $coli$ ATC25922 pellets ($1.0 \times 10^4$ cfu/pellet) were put in a hydration liquid and hydrated for 30 minutes at 37° C. After hydration, the mixture was vortexed and added to 250 ml liquid LB medium and incubated in a shaker incubator at 37° C. for 24 hours. After the 24 hour inoculation period, the $E.$ $coli$ culture was collected. The incubated $E.$ $coli$ bacteria were diluted at 1:100 and sub-cultured in the shaker incubator at 37° C. for 4 hours.

A soft agar solution was mixed with 100 ml of LB medium and autoclaved at 250° F. and 230 psi for 20 minutes. The solution was added into 4 sterile petri dishes, covered, and kept under room temperature until the liquid mixtures became solid.

Before $E.$ $coli$ was introduced to the denticle array, each denticle array was firmly adhered to the bottom of a petri dish with the denticles facing upward. The denticle array fixed in the petri dish was sterilized with 95% ethanol for 10 min and then was rinsed 3 times with DI water before being allowed to dry in air. First, a sub-cultured $E.$ $coli$ solution was poured into petri dishes, and denticle arrays were submerged and stored at room temperature for 1 hour. Second, the $E.$ $coli$ that were not attached to the denticle arrays were removed by rinsing with 1×PBS for 10 seconds while rotating 3 times. 1 L of 1× phosphate buffered saline (PBS) was made using 800 ml of DI water, 8 g of NaCL, 0.2 g of KCl, 1.44 g of $Na_2HPO_4$, and 0.245 g of $KH_2PO_4$, mixed well. The solution was adjusted to a pH value of 7.4. More DI water was added to increase the volume to 1 L. The petri dishes with samples were air dried at room temperature for 1 hour. Each sample was taken from the petri dish and pressed onto a soft agar plate for 5 seconds to minimize air bubbles between the denticle array surface and the agar. The soft agar plates were then incubated at 37° C. for 24 hours. After incubation, each soft agar plate was photographed.

FIG. 10A is a photograph of the $E.$ $coli$ growth on the control sample. FIG. 10B is a photograph of the $E.$ $coli$ growth on the large size denticle array 301A. FIG. 10C is a photograph of the $E.$ $coli$ growth on the medium size denticle array 301B. FIG. 10D is a photograph of the $E.$ $coli$ growth on the small size denticle array 301C. FIG. 11 is a graph illustrating $E.$ $coli$ growth area.

The control sample's $E.$ $coli$ growth area after 24 hours was larger than the denticle arrays with medium size denticles 300B and small size denticles 300C, but smaller than the denticle array with large size denticles 300A. The $E.$ $coli$ growth area was reduced from 6.01 cm$^2$ in the control sample to 2.41 cm$^2$ in the medium size denticle array 301B (60% reduction). The $E.$ $coli$ growth area was reduced from 6.01 cm$^2$ in the control sample to 2.25 cm$^2$ in the small size denticle array 301C (63% reduction). The results were statistically significant, indicating antimicrobial properties for the small size denticle arrays 301C and medium size denticle array 301B.

The bacterial growth area increased about 42% from the control sample to the large size denticle array 301A. However, the increase in bacterial growth was not statistically significant, suggesting that the anti-microbial behavior between the control sample and the large size denticle array 301A were not significantly different.

The control sample has a higher surface area when compared to the small size denticle array 301C and medium size denticle array 301B. The control sample had a lower surface area than the large size denticle array 301A. As the surface area of the denticle array decreased, the anti-microbial behavior increased. The spacing between adjacent denticles was reduced when the denticle size was decreased, resulting in smaller spaces between denticles. By decreasing the size of the denticles (and thus the surface area and spacing between denticles), the bacteria attachment to the surface of the denticles is decreased due to steric hindrance, thus improving anti-microbial behavior.

Experiment 2

Figure 12A:
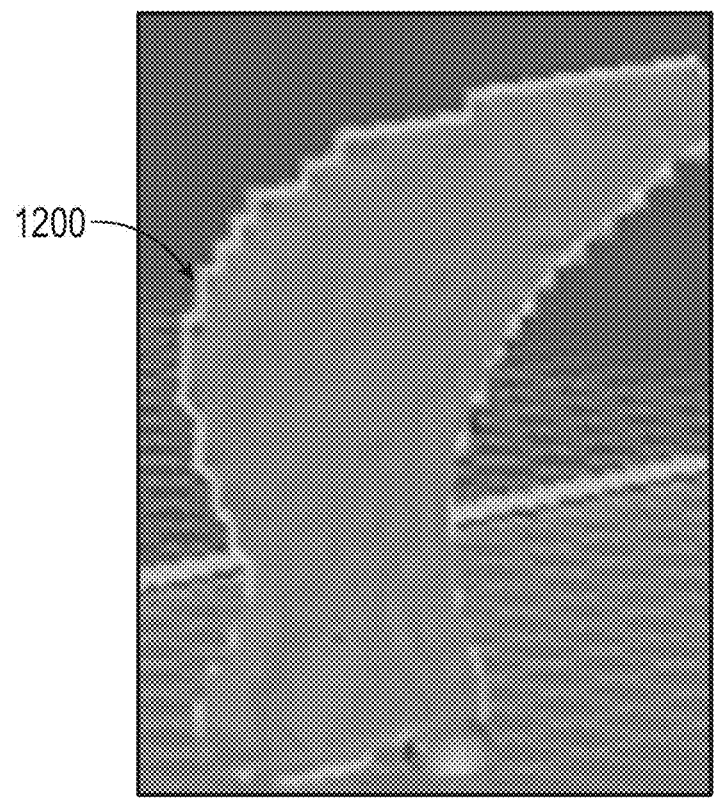
FIG. 12A illustrates a cross-sectional view of a denticle, according to one or more embodiments described herein.
Figure 12B:
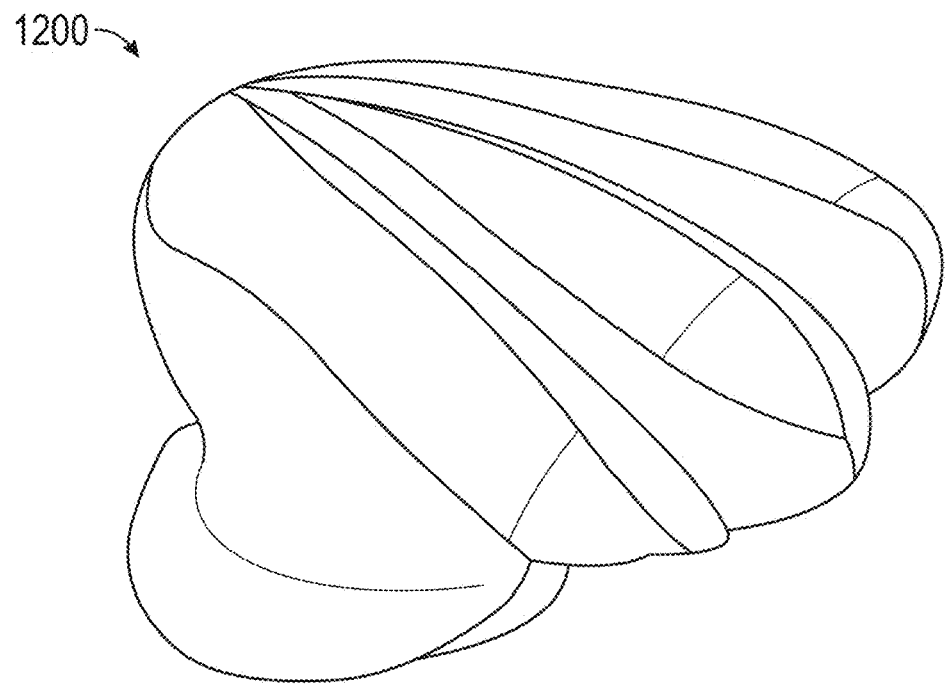
FIG. 12B illustrates a rear perspective view of the denticle of FIG. 12A, according to one or more embodiments described herein.
Figure 12C:
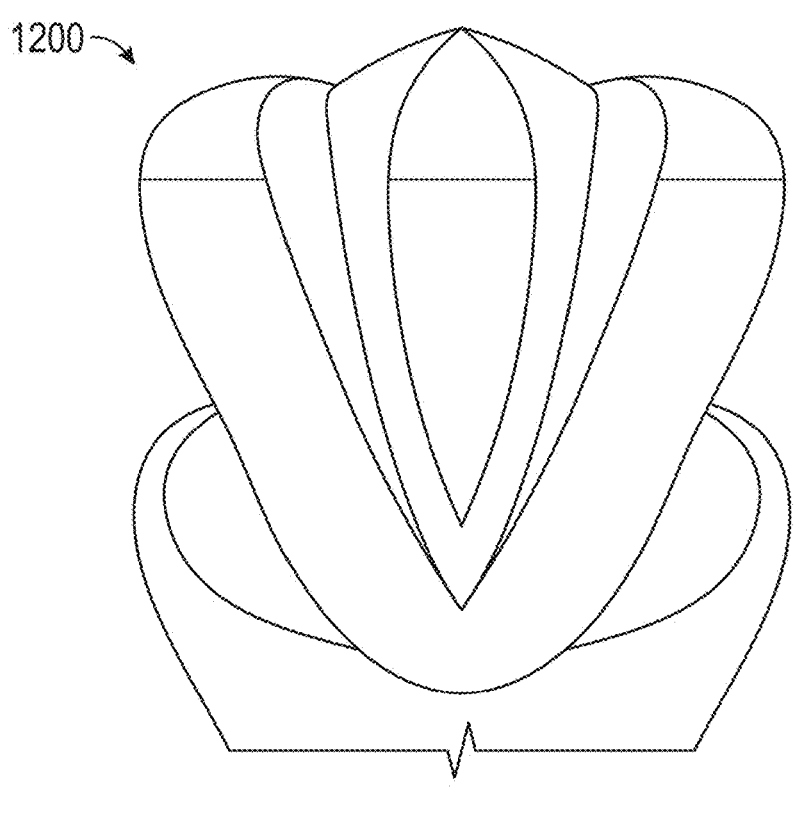
FIG. 12C illustrates a front perspective view of the denticle of FIG. 12A, according to one or more embodiments described herein.
Figure 12D:
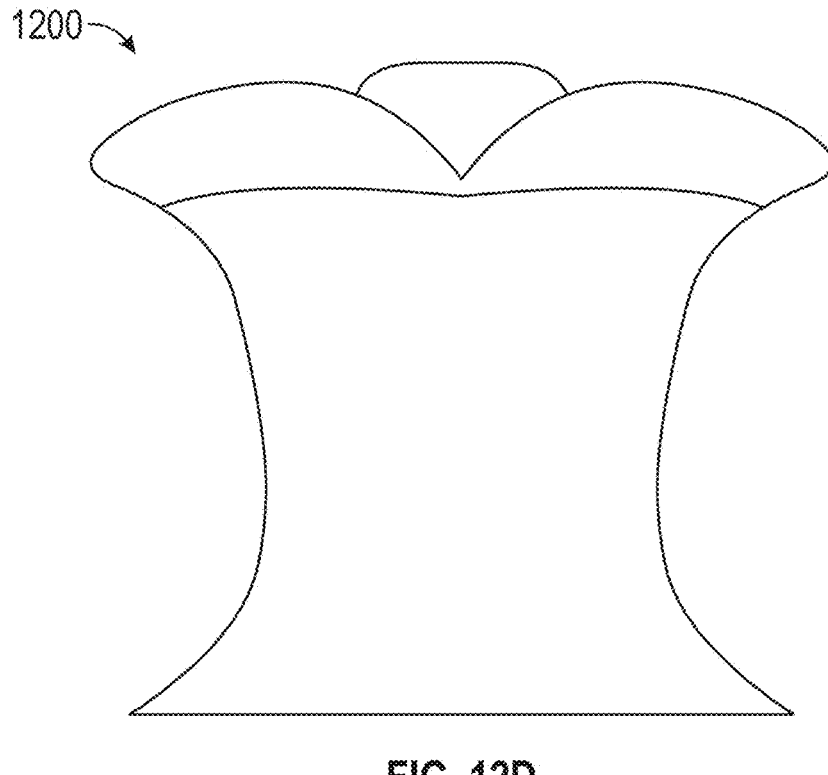
FIG. 12D illustrates a front view of the denticle of FIG. 12A, according to one or more embodiments described herein.

FIG. 12A illustrates a cross-sectional view of a denticle 1200. FIG. 12B illustrates a rear perspective of the denticle 1200. FIG. 12C illustrates a front perspective of the denticle 1200. FIG. 12D illustrates a front view of the denticle 1200.

Figure 12E:
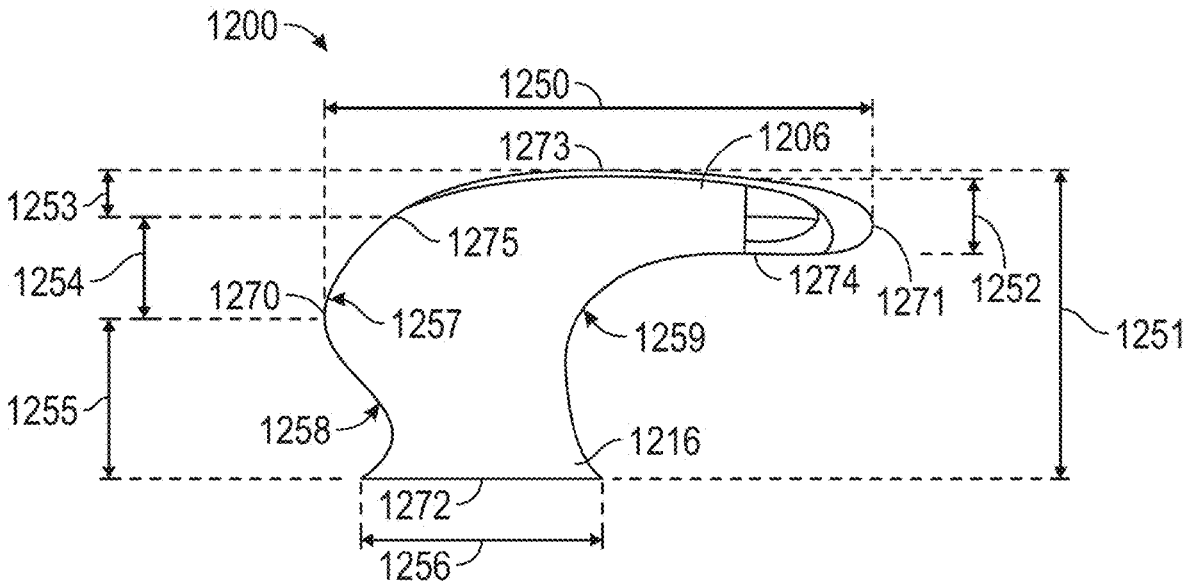
FIG. 12E illustrates a side view of the denticle of FIG. 12A, according to one or more embodiments described herein.

FIG. 12E illustrates a side view of the denticle 1200. The denticle 1200 has a first length 1250 from a front edge 1270 of the denticle 1200 to the rear edge 1271 of the denticle 1200. The front edge 1270 is the frontmost point of the denticle 1200. The rear edge is the rearmost point of the denticle 1200. The first length 1250 is about 1.5 mm to about 2.6 mm. The denticle 1200 has a first height 1251 from a bottom edge 1272 of the denticle 1200 to a top edge 1273 of an upper body 1206 of the denticle 1200. The top edge 1273 is the highest point on the denticle 1200. The bottom edge 1272 is the lowest point on the denticle 1200. The first height 1251 is about 0.7 mm to about 1.7 mm. A lower body 1216 has a second length 1256. The second length 1256 is from about 0.5 mm to about 1.5 mm. The denticle 1200 has a second height 1252 from the bottom edge of the prongs 1274 to the top edge 1273 of the denticle 1200. The second height 1252 is about 0.1 mm to about 0.4 mm. The denticle 1200 has a third height 1255 from the bottom edge 1272 to the front edge 1270. The third height 1255 is about 0.3 mm to about 0.9 mm. The denticle 1200 has a fourth height 1254 from the front edge to a prong midpoint 1275. The fourth height 1254 is about 0.2 mm to about 0.6 mm. The denticle 1200 has a fifth height 1253 from the prong midpoint 1275 to the top edge 1273. The fifth height 1253 is about 0.1 mm to about 0.3 mm. A first radius of curvature 1257 between the prong midpoint 1275 and the top edge 1273 is about 0.25 mm to about 0.35 mm. A second radius of curvature 1258 from a bottom edge 1272 to a front edge 1270 is about 0.25 mm to about 0.35 mm. A third radius of curvature 1259 from a bottom edge 1272 to a rear edge 1271 is about 0.5 mm to about 1.5 mm.

Figure 12F:
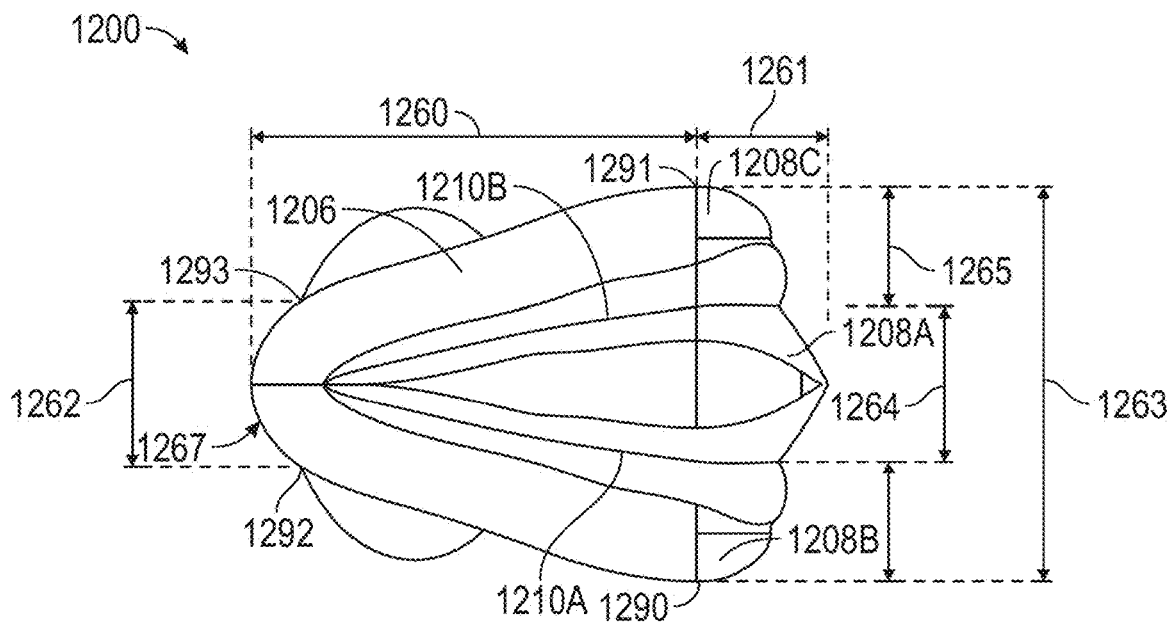
FIG. 12F illustrates a top view of the denticle of FIG. 12A, according to one or more embodiments described herein.

FIG. 12F illustrates a top view of the denticle 1200. The denticle 1200 has a first prong 1208A, a second prong 1208B, a third prong 1208C, a first ridge 1210A, and a second ridge 1210B. The first ridge 1210A is between the first prong 1208A and the second prong 1208B. The second ridge 1210B is between the first prong 1208A and the third prong 1208C. The denticle 1200 has a first width 1263 from a first outermost edge 1290 to a second outermost edge 1291. The first outermost edge 1290 is on the second prong 1208B. The second outermost edge 1291 is on the third prong 1208C. The first width is about 1.0 mm to about 2.0 mm. The first prong 1208A has a second width 1264 from a midpoint of the first ridge 1210A to a midpoint of the second ridge 1210B. The second width 1264 is about 0.3 mm to about 0.9 mm. The second prong 1208B has a third width 1266 from the midpoint of the first ridge 1210A to the first outermost edge 1290. The third width 1266 is about 0.2 mm to about 0.7 mm. The third prong 1208B has a fourth width 1265 from the midpoint of the second ridge 1210B to the second outermost edge 1291. The fourth width 1265 is about 0.2 mm to about 0.46 mm. A fifth width 1262 is from the first point 1292 to a second point 1293. The fifth width 1262 is about 0.5 mm to about 1.0 mm. A fourth radius of curvature 1267 from the first point 1292 to the second point 1293 is about 0.25 mm to about 0.5 mm. A third length 1260 is from the front edge 1270 to second outermost edge 1291. The third length 1260 is about 1.3 mm to about 2.1 mm. A fourth length 1261 is from the second outermost edge 1291 to the rear edge 1271. The fourth length 1261 is about 0.2 mm to about 0.6 mm.

Figure 13A:
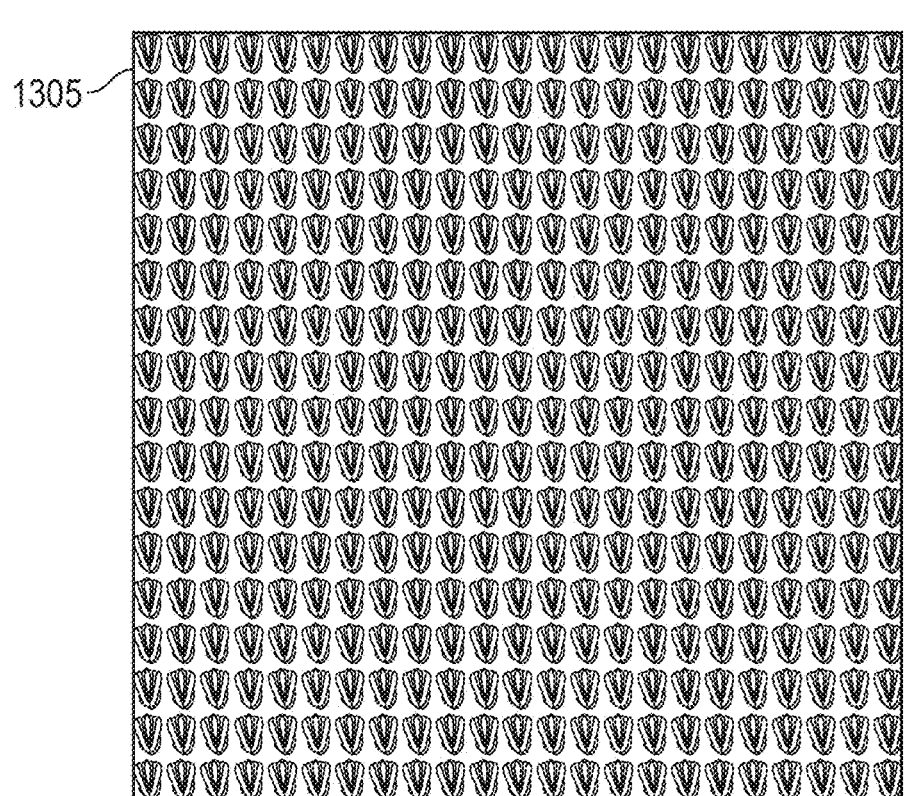
FIG. 13A illustrates a top view of a denticle array, according to one or more embodiments described herein.
Figure 13B:
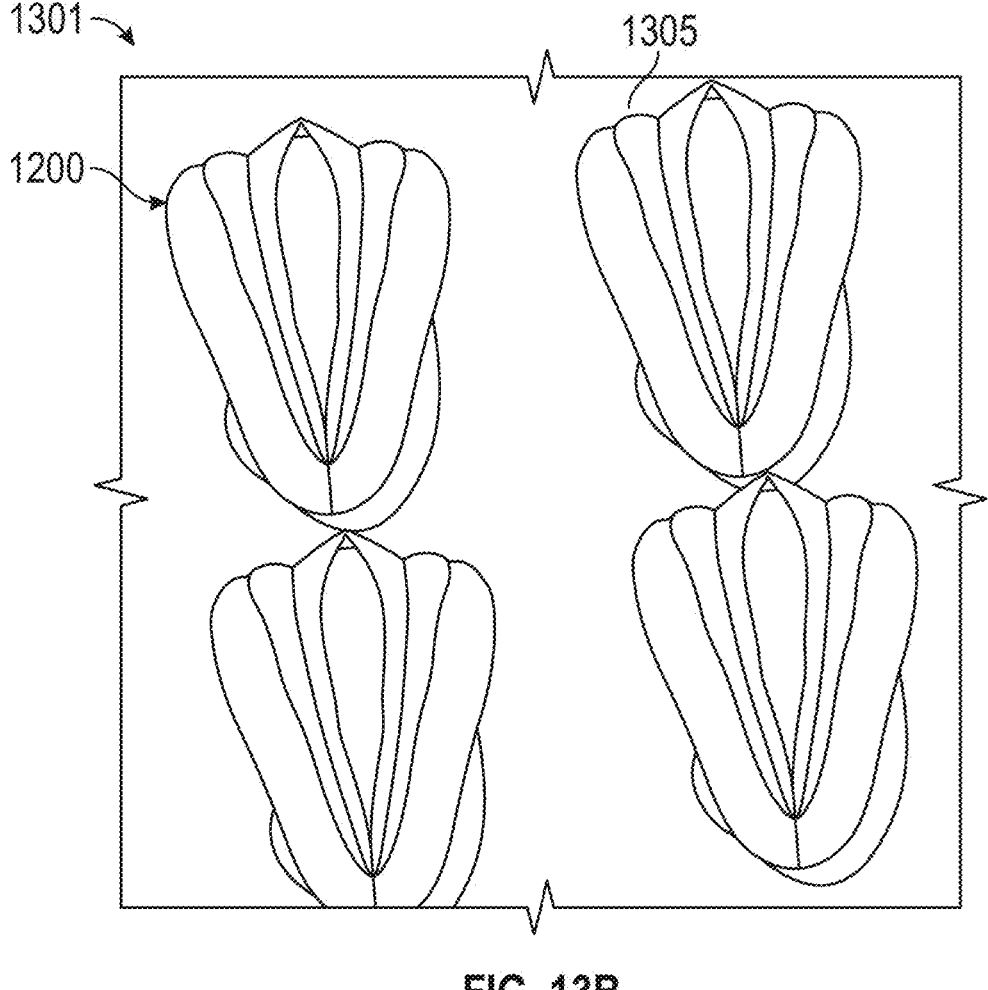
FIG. 13B illustrates a top perspective view of the denticle array of FIG. 13A, according to one or more embodiments described herein.
Figures 13C, 13D:
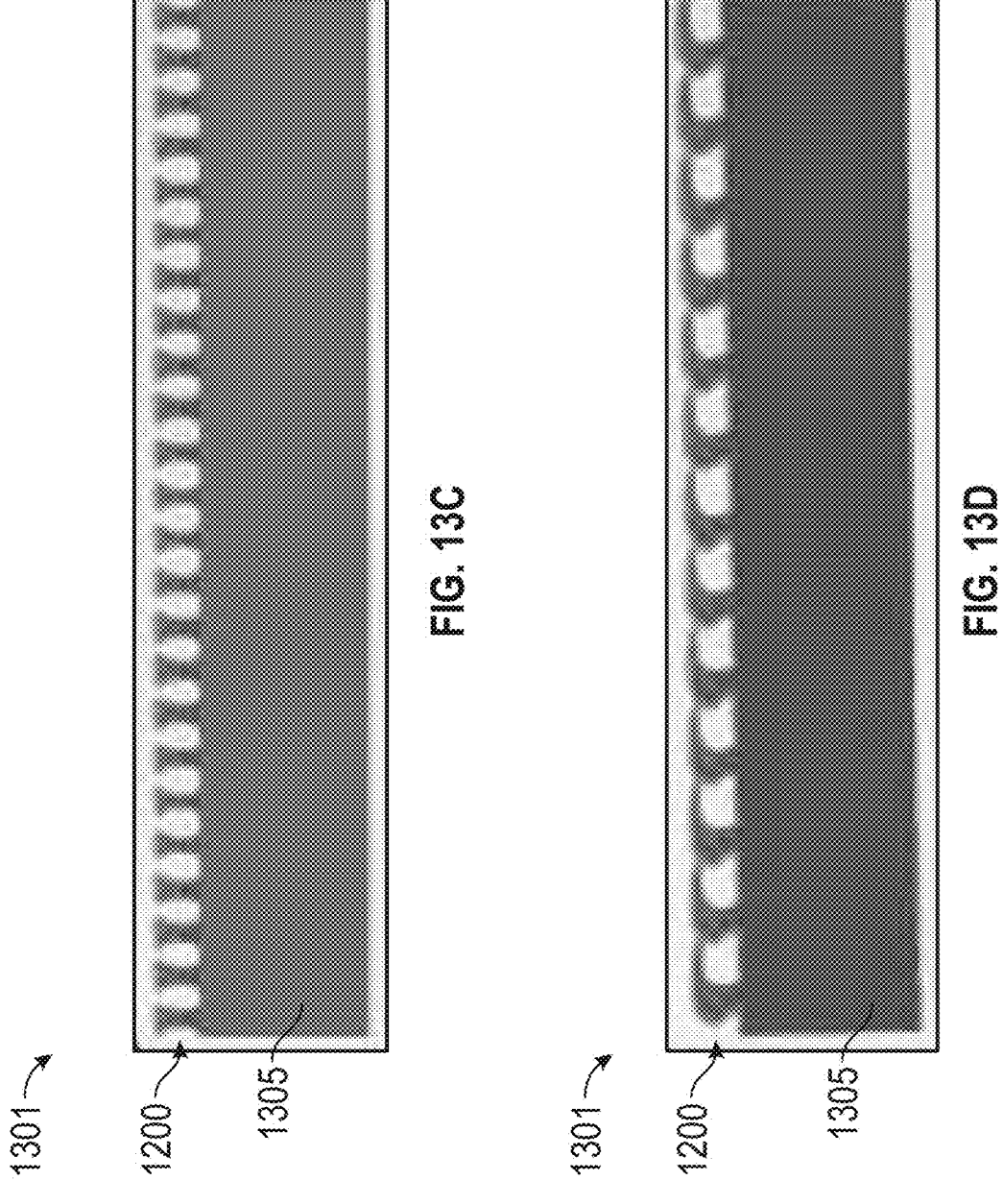
FIG. 13C illustrates a front view of the denticle array of FIG. 13A, according to one or more embodiments described herein.
FIG. 13D illustrates a side view of the denticle array of FIG. 13A, according to one or more embodiments described herein.

FIG. 13A illustrates a top view of a denticle array 1301. FIG. 13B illustrates a top perspective of the denticle array 1301. FIG. 13C illustrates a front view of a denticle array 1301. FIG. 13D illustrates a side view of the denticle array 1301. The denticle array 1301 includes a substrate 1305. The denticles 1200 are disposed on the substrate 1305. The denticle array 1301 has the denticles 1200 arranged into an aligned denticle array, as shown in FIG. 2B. Two denticle arrays 1301 were fabricated, a thick polyurethane (PU) array and a thin PU array. The thick PU array *had a thickness of about* 1.05 mm. The thin PU array has a thickness of 0.75 mm.

The denticles may be printed by fused deposition modeling (FDM) printers with polycarbonate (PC)/acrylonitrile butadiene styrene (ABS) or polyurethane (PU) resin. The denticles have three surface ridges and three prongs printed by FDM printers. The denticle array was printed by an Autodesk Ember Photopolymer Printer using PC/ABS resin or polyurethane (PU) resin.

The PC/ABS resin used in the photopolymer printer resulted in stiff denticle arrays, while the polyurethane resin developed a flexible denticle array with tough denticles. PU resin has inherent elastomeric properties, enabling the formation of a flexible denticle array along with the tough denticles. The printed PU films mimicked the quality of fabrics for clothing.

Figure 14:
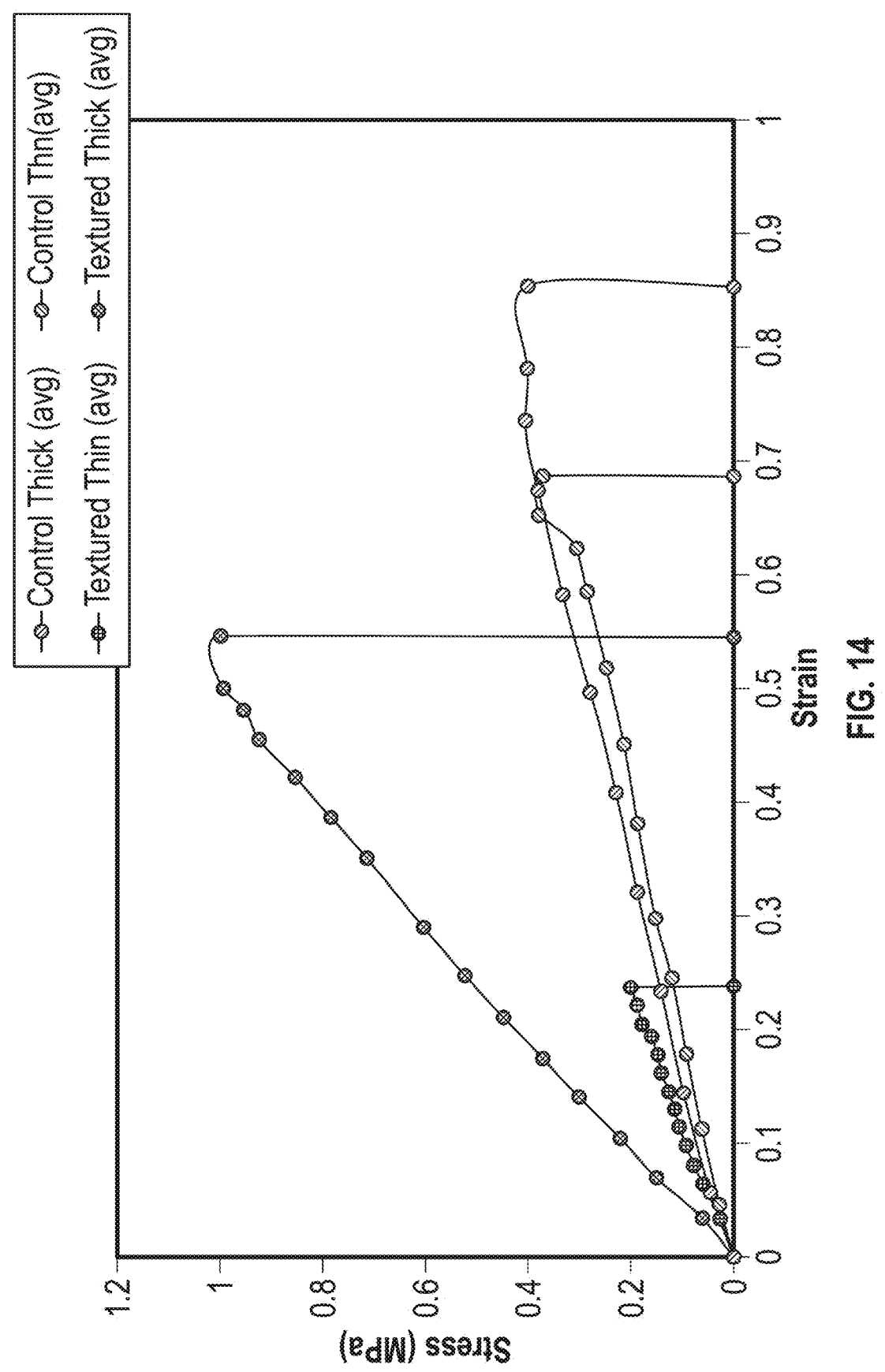
FIG. 14 illustrates a stress-strain curve of the denticle arrays, according to one or more embodiments described herein.

FIG. 14 illustrates a stress-strain curve of the samples. The mechanical properties of the denticle arrays were tested according to ASTM D882. A thick untextured PU sample and a thin untextured PU sample were used as a control against a thick PU array and a thin PU array. The thick PU array exhibited a stress-strain behavior typical of man-made fibers. For polymeric fabrics, deformation prior to the yield point is reversible. After the yield point, deformation is irreversible and the strain smoothening phenomenon occurs where the stress decreases due to an increase in strain. After the strain smoothening phenomenon, the stress increases until the breaking point.

The fracture of the thick PU array and thin PU array occurred at the area of the array which was gripped by the testing machine due to the stress concentration by the grip of the testing machine. This indicates that the mechanical strength of the thick PU array and thin PU array are greater than represented in the test results. Table 2 summarized the mechanical testing results.

TABLE 3

Mechanical Testing Results

| Sample | | Tensile Strength (MPa) | Breaking Strain (%) | Young's Modulus (MPa) |
|---|---|---|---|---|
| PU Arrays | Thin | 0.201 | 23.86 | 0.781 |
| | Thick | 0.994 | 54.5 | 1.958 |
| Untextured | Thin | 0.366 | 68.72 | 0.667 |
| Samples | Thick | 0.392 | 85.45 | 0.356 |

FIGS. 15-16 show the results of the anti-microbial test. The anti-microbial properties of the denticle arrays with different sizes of denticles 100 were evaluated using an immersion inoculation assay method. The prevention of bacterial growth was measured by the area occupied by bacteria after incubation. Untextured polyurethane (PU) was used as a control sample against a thick PU array, a thin PU array, an aluminum foil sample, and a copper foil sample.

A Luria Broth (LB) culture media solution was used to inoculate and dilute an *E. coli* ATCC25922 samples. The LB solution was made of 500 ml of deionized (DI) water, 5 g of tryptone, 2.5 of NaCL, and 2.5 g of yeast extract. The solution was autoclaved at 250° F. and 23 psi for 20 minutes. Two premade *E. coli* ATC25922 pellets (1.0×10$^4$ cfu/pellet) were put in a hydration liquid and mixed by shaking. The samples were hydrated for 30 minutes at 37° C. The hydrated *E. coli* was inoculated in a 250 LB media solution. The mixtures was incubated at 37° C. for 24 hours in an incubator. The incubated *E. coli* bacteria were diluted at 1:100 with a 700 ml LD media solution. The diluted solution was sub-cultured in the incubator at 37° C. for 4 hours.

A soft agar solution was made by mixing 700 ml of DI water, 7 g of tryptone, 3.5 g of NaCl, 3.5 g of yeast extract, and 6.3 g of agar powder. The solution was autoclaved at 273° F. and 28 psi for 1 hour before the solution was added into 20 sterile petri dishes, covered, and kept under room temperature for 2 hours.

Figure 16A:
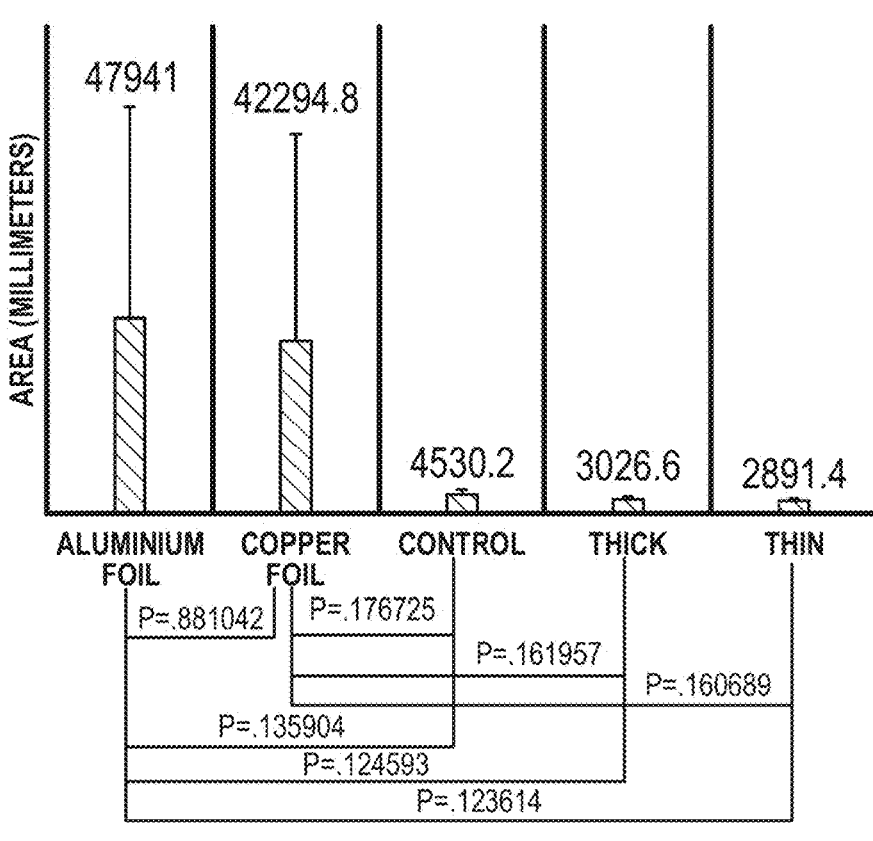
FIG. 16A is a graph illustrating *E. coli* growth area for the control sample, the aluminum foil sample, the copper foil sample, the thick PU array, and the thin PU array, according to one or more embodiments described herein.
Figure 16B:
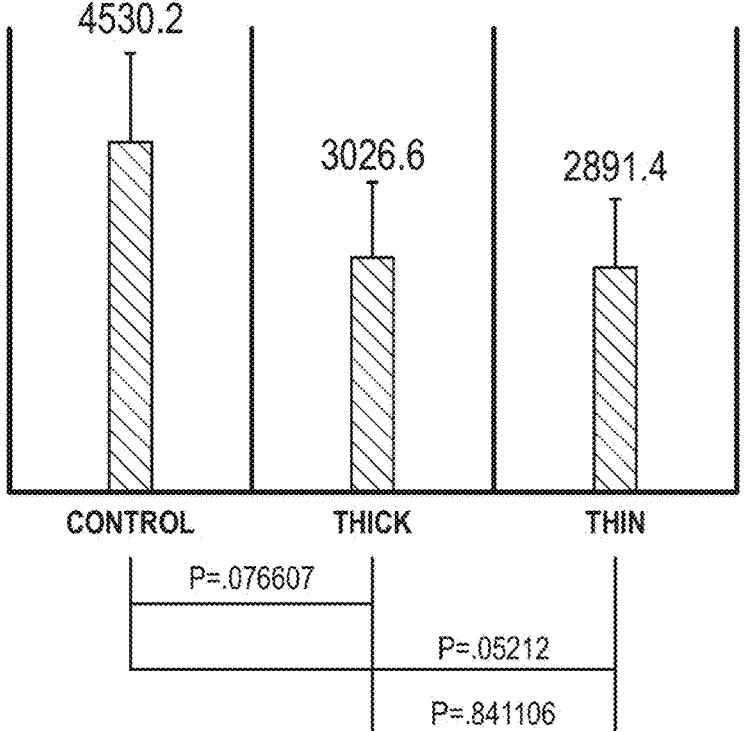
FIG. 16B is a graph illustrating *E. coli* growth area for the control sample, the thick PU array, and the thin PU array, according to one or more embodiments described herein.

FIG. 15A is a photograph illustrating *E. coli* growth on the control sample. FIG. 15B is a photograph illustrating *E. coli* growth on the copper foil sample. FIG. 15C is a photograph illustrating *E. coli* growth on the thick PU array. FIG. 15D is a photograph illustrating *E. coli* growth on the thin PU array. FIG. 16A is a graph illustrating *E. coli* growth area for the control sample, the aluminum foil sample, the copper foil sample, the thick PU array, and the thin PU array. FIG. 16B is a graph illustrating *E. coli* growth area for the control sample, the thick PU array, and the thin PU array. The tested petri dishes visibly showed overlapped bacterial colonies. Thus, instead of counting bacterial colonies, the results were analyzed by means of quantification of the area of bacterial growth for each sample.

The results demonstrated a reduction of bacterial growth in the thin PU samples and the thick PU samples. The highest bacterial growth was observed in the aluminum foil sample (47941 mm$^2$). The copper foil sample exhibited reduced bacterial growth (42294 mm$^2$) compared to the aluminum foil sample, corresponding to copper being considered an anti-microbial agent. The thin PU array (2891 mm$^2$) and thick PU array (3026 mm$^2$) exhibited smaller comparative p-values than the aluminum, copper, and control samples (4530 mm$^2$). A smaller p-value is indicative of anti-microbial activity in the test sample. The small p-value of the thin PU array and the thick PU array indicated that the denticles have anti-microbial activity. The current results indicate that the thin PU array had a 93.1% reduction in bacterial growth, while the thick PU array had a 92.8% reduction in bacterial growth. No statistically significant difference in terms of anti-microbial activity was observed between the thick PU array and the thin PU array. Thus, thickness did not play a vital role in the anti-microbial properties of the denticle arrays and varying thicknesses may be utilized while realizing improved anti-microbial properties of the denticle arrays.

The thick PU array and thin PU array demonstrated a 33.16% and 36.17% bacterial reduction in comparison to the control sample. The built-in riblet effect increases the anti-bacterial behavior and ensures consistent anti-microbial behavior through a period of use and wash cycles, exhibiting potential in functional clothing as a non-toxic anti-microbial material.

Figures 17A, 17B, 17C:
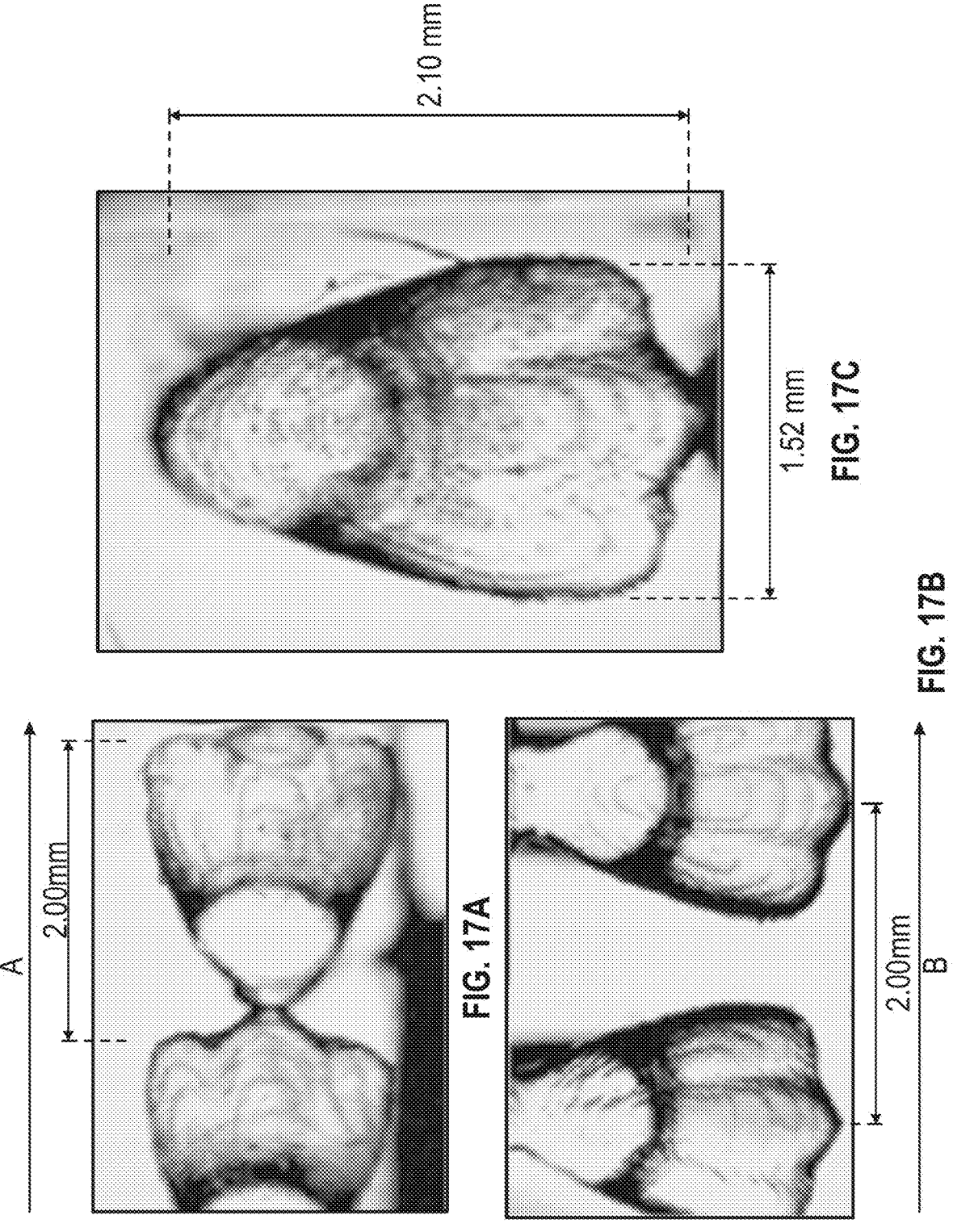
FIG. 17A is a micrograph illustrating adjacent denticles along Direction A, according to embodiments, according to one or more embodiments described herein.
FIG. 17B is a micrograph illustrating adjacent denticles along Direction B, according to one or more embodiments described herein.
FIG. 17C is a micrograph illustrating a denticle, according to one or more embodiments described herein.

FIG. 17A is a micrograph illustrating of adjacent denticles along Direction A. FIG. 17B is a micrograph illustrating of adjacent denticles along Direction B. FIG. 17C is a micrograph illustrating of a denticle. The denticles are spaced apart in Direction B by about 2 mm. The denticles are about 2.1 mm in length and about 1.5 mm in width. The denticles were spaced equidistant along Direction A at 2 mm. The optical images revealed a detailed riblet structure comprising three surface ridges and three posteriorly pointing prongs which were observed in the images of natural shark skin.

Embodiments described herein relate to bio-mimicked shark skin denticles. The denticles have an upper portion and a lower portion. The upper portion includes an upper body with a first prong, second prong, and third prong. The first prong and second prong are separated by a first ridge. The first prong and the third prong are separated by a second ridge. The first prong is longer than the second prong and the third prong. The denticle may be disposed on a substrate to create a denticle array. The denticle and substrate may be elastomeric materials. The denticle array exhibits mechanical properties matching or exceeding conventional fabrics. The denticle array further exhibits anti-microbial properties, making it beneficial in functional clothing and other applications.

As is apparent from the foregoing general description and the specific aspects, while forms of the aspects have been illustrated and described, various modifications can be made without departing from the spirit and scope of the present disclosure. Accordingly, it is not intended that the present disclosure be limited thereby. Likewise, the term "comprising" is considered synonymous with the term "including." Likewise whenever a composition, process operation, process operations, an element or a group of elements is preceded with the transitional phrase "comprising," it is understood that we also contemplate the same composition or group of elements with transitional phrases "consisting essentially of," "consisting of," "selected from the group of consisting of," or "Is" preceding the recitation of the composition, process operation, process operations, element, or elements and vice versa, such as the terms "comprising," "consisting essentially of," "consisting of" also include the product of the combinations of elements listed after the term.

For purposes of this present disclosure, and unless otherwise specified, all numerical values within the detailed description and the claims herein are modified by "about" or "approximately" the indicated value, and consider experimental error and variations that would be expected by a person having ordinary skill in the art. For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. For example, the recitation of the numerical range 1 to 5 includes the subranges 1 to 4, 1.5 to 4.5, 1 to 2, among other subranges. As another example, the recitation of the numerical ranges 1 to 5, such as 2 to 4, includes the subranges 1 to 4 and 2 to 5, among other subranges. Additionally, within a range includes every point or individual value between its end points even though not explicitly recited. For example, the recitation of the numerical range 1 to 5 includes the numbers 1, 1.5, 2, 2.75, 3, 3.80, 4, 5, among other numbers. Thus, every point or individual value may serve as its own lower or upper limit combined with any other point or individual value or any other lower or upper limit, to recite a range not explicitly recited.

While the foregoing is directed to embodiments of the present disclosure, other and further embodiments of the disclosure may be devised without departing from the basic scope thereof.

What is claimed is:

1. A denticle, comprising:
an upper portion, the upper portion comprising:
an upper body, comprising:
an upper body width;
a first prong extending from a front end of the denticle to a rear end of the denticle;
a second prong extending from the front end of the denticle to the rear end of the denticle;
a third prong extending from the front end of the denticle to the rear end of the denticle;
a first ridge separating the first prong and second prong; and
a second ridge separating the first prong from the third prong,
wherein the first prong has a first prong length greater than a second prong length of the second prong and the third prong; and
a center width at an interface between the upper portion and a lower portion; and
the lower portion comprising a lower body having a lower body width, wherein the upper body width is greater than the lower body width,
wherein the denticle is operable to reduce a dragging force of fluid over the denticle.

2. The denticle of claim 1, wherein the denticle comprises polycarbonate (PC), acrylonitrile butadiene styrene (ABS), elastomeric polyurethane (PU), silicone, acrylate-based resins, or combinations thereof.

3. The denticle of claim 1, wherein the denticle is doped with gold (Au), silver (Ag), copper (Cu), iron (Fe), molybdenum (Mo), zinc (Zn), titanium (Ti), or combinations thereof.

4. The denticle of claim 1, further comprising:
the lower body has a lower body length, wherein the first prong length is greater than the lower body length.

5. The denticle of claim 4, wherein the first prong length is from about 100 nm to about 5 mm.

6. The denticle of claim 1, wherein the denticle has a height from about 100 nm to about 5 mm.

7. The denticle of claim 1, wherein the denticle has a width from about 100 nm to about 5 mm.

8. A denticle array, comprising:
a substrate;
a plurality of denticles coupled to the substrate, each denticle of the plurality of denticles comprising:
an upper portion, the upper portion comprising:
an upper body, comprising:
an upper body width;
a first prong extending from a front end of the denticle to a rear end of the denticle;
a second prong extending from the front end of the denticle to the rear end of the denticle;
a third prong extending from the front end of the denticle to the rear end of the denticle;
a first ridge separating the first prong and second prong; and a second ridge separating the first prong from the third prong, wherein the first prong has a length greater than the second prong and the third prong; and a center width at an interface between the upper portion and a lower portion; and the lower portion comprising a lower body having a lower body width, wherein the upper body width is greater than the lower body width, wherein the denticle is operable to reduce a dragging force of fluid over the denticle.

9. The denticle of claim 8, wherein the denticle has anti-microbial properties.

10. The denticle array of claim 8, wherein the denticles comprise polycarbonate (PC), acrylonitrile butadiene styrene (ABS), elastomeric polyurethane (PU), silicone, acrylate-based resins, or combinations thereof.

11. The denticle array of claim 9, wherein the denticle is doped with gold (Au), silver (Ag), copper (Cu), iron (Fe), molybdenum (Mo), zinc (Zn), titanium (Ti), or combinations thereof.

12. The denticle array of claim 8, wherein the substrate comprises polycarbonate (PC), acrylonitrile butadiene styrene (ABS), elastomeric polyurethane (PU), silicone, acrylate-based resins, or combinations thereof.

13. The denticle array of claim 8, wherein the substrate has a thickness from about 0.1 mm to about 5 mm.

14. The denticle array of claim 8, wherein the denticles of the denticle array are aligned at an alignment angle of 0° from a plane of a first direction.

15. The denticle array of claim 8, wherein adjacent denticles of the denticle array are arranged at one or more alignment angles, wherein the one or more alignment angles are from 0° to 359° from a plane of a first direction.

16. The denticle array of claim 8, wherein a center point of a denticle is aligned in a first direction and a second direction with an adjacent denticle.

17. The denticle array of claim 8, wherein a center point of a denticle is a distance from the center point of an adjacent denticle.

18. The denticle array of claim 17, wherein the distance is from about 0.5 nm to about 2.5 mm.

19. The denticle array of claim 8, wherein a denticle density is from about 40 denticles/cm$^2$ and about 160 denticles/cm$^2$.

20. A textile, comprising:
a substrate;
a plurality of denticles coupled to the substrate, each denticle of the plurality of denticles comprising:
an upper portion, the upper portion comprising:
an upper body, comprising:
an upper body width;
a first prong extending from a front end of the denticle to a rear end of the denticle;
a second prong extending from the front end of the denticle to a rear end of the denticle;

a third prong extending from the front end of the denticle to a rear end of the denticle;

a first ridge separating the first prong and second prong; and a second ridge separating the first prong from the third prong, wherein the first prong has a first prong length greater than a second prong length of the second prong and the third prong; and a center width at an interface between the upper portion and a lower portion; and the lower portion comprising a lower body having a lower body width, wherein the upper body width is greater than the lower body width, wherein the denticle is operable to reduce a dragging force of fluid over the denticle.

21. The textile of claim 20, wherein the denticle comprises polycarbonate (PC), acrylonitrile butadiene styrene (ABS), elastomeric polyurethane (PU), silicone, acrylate-based resins, or combinations thereof.

22. The textile of claim 20, wherein the denticle is doped with gold (Au), silver (Ag), copper (Cu), iron (Fe), molybdenum (Mo), zinc (Zn), titanium (Ti), or combinations thereof.

23. The textile of claim 20, wherein the denticle has anti-microbial properties.

24. The textile of claim 20, further comprising:
the lower body has a lower body length, wherein the first prong length is greater than the lower body length.

25. The textile of claim 24, wherein the first prong length is from about 100 nm to about 5 mm.

26. The textile of claim 20, wherein the denticle has a height from about 100 nm to about 5 mm.

27. The textile of claim 20, wherein the denticle has a width from about 100 nm to about 5 mm.

28. The textile of claim 20, wherein the substrate has a thickness from about 0.1 mm to about 5 mm.

29. The textile of claim 20, wherein the denticles of the textile are aligned at an alignment angle of 0° from a plane of a first direction.

30. The textile of claim 20, wherein adjacent denticles of the textile are arranged at one or more alignment angles, wherein the one or more alignment angles are from 0° to 359° from a plane of a first direction.

31. The textile of claim 20, wherein a center point of a denticle is aligned in a first direction and a second direction with an adjacent denticle.

32. The textile of claim 20, wherein a center point of a denticle is a distance from the center point of an adjacent denticle.

33. The textile of claim 32, wherein the distance is from about 0.5 nm to about 2.5 mm.

34. The textile of claim 20, wherein a denticle density is from about 40 denticles/cm$^2$ and about 160 denticles/cm$^2$.

* * * * *